United States Patent
Katoh et al.

(10) Patent No.: US 10,205,344 B2
(45) Date of Patent: Feb. 12, 2019

(54) POWER DISPLAY SYSTEM, IMAGE PROCESSING APPARATUS, AND USER INTERFACE

(71) Applicants: Masaya Katoh, Kanagawa (JP); Kiriko Chosokabe, Tokyo (JP); Kohji Yamamoto, Kanagawa (JP)

(72) Inventors: Masaya Katoh, Kanagawa (JP); Kiriko Chosokabe, Tokyo (JP); Kohji Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 445 days.

(21) Appl. No.: 14/824,449

(22) Filed: Aug. 12, 2015

(65) Prior Publication Data

US 2016/0062627 A1 Mar. 3, 2016

(30) Foreign Application Priority Data

Aug. 29, 2014 (JP) ................................ 2014-174776

(51) Int. Cl.
*H02J 13/00* (2006.01)
*G06F 11/30* (2006.01)

(52) U.S. Cl.
CPC ............ *H02J 13/001* (2013.01); *G06F 11/30* (2013.01); *Y04S 10/40* (2013.01)

(58) Field of Classification Search
CPC ......... H04L 67/42; H04L 51/06; H04L 67/34; G06F 8/60
See application file for complete search history.

(56) References Cited

U.S. PATENT DOCUMENTS 6,658,994 B1 * 12/2003 McMillan ............. A23L 3/3418 219/214
8,682,904 B1 * 3/2014 Weber ................ G06F 17/3053 707/748

(Continued)

FOREIGN PATENT DOCUMENTS

JP 2005-346179 A 12/2005
JP 2011-216039 A 10/2011

(Continued)

OTHER PUBLICATIONS

"An introduction to databases," website at the University College London, downloaded from http://www.ucl.ac.uk/archaeology/cisp/database/manual/node1.html, dated Oct. 24, 2013, as indicated on p. 7 by waybackmachine.org.*

(Continued)

*Primary Examiner* — Jennifer N To
*Assistant Examiner* — Eric J Yoon
(74) *Attorney, Agent, or Firm* — Harness, Dickey & Pierce, P.L.C.

(57) ABSTRACT

A power display system includes an electronic apparatus and a server connected to an electronic apparatus group including the electronic apparatus. Further, the power display system includes a calculation unit totaling consumption power by the electronic apparatus group and calculating a ratio of the totaled consumption power to a target value of the consumption power, and a display control unit displaying a display part, which indicates a use status of power, in a display area of the electronic apparatus in a display manner which corresponds to the ratio.

19 Claims, 28 Drawing Sheets

(56) References Cited

U.S. PATENT DOCUMENTS

| | | | |
|---|---|---|---|
| 2011/0244441 A1 | 10/2011 | Okabayashi et al. | |
| 2011/0320054 A1* | 12/2011 | Brzezowski | G06Q 10/06315 |
| | | | 700/291 |
| 2012/0310416 A1* | 12/2012 | Tepper | G05B 15/00 |
| | | | 700/276 |
| 2013/0074008 A1 | 3/2013 | Umezawa et al. | |
| 2013/0194603 A1 | 8/2013 | Imaizumi et al. | |
| 2014/0098395 A1 | 4/2014 | Chosokabe et al. | |
| 2015/0070726 A1 | 3/2015 | Umezawa et al. | |
| 2015/0106364 A1* | 4/2015 | Schpok | G06F 17/30265 |
| | | | 707/724 |
| 2017/0177940 A1* | 6/2017 | Jin | G06K 9/00671 |

FOREIGN PATENT DOCUMENTS

| | | |
|---|---|---|
| JP | 2012-194939 A | 10/2012 |
| JP | 2013-90092 A | 5/2013 |
| JP | 2013-099004 | 5/2013 |
| JP | 2013-157835 A | 8/2013 |
| JP | 2013-166339 A | 8/2013 |
| JP | 2014-241052 | 12/2014 |
| JP | 2015-001849 | 1/2015 |
| JP | 2015-080196 | 4/2015 |

OTHER PUBLICATIONS

TrishTech.com, Calibrate PC Power Consumption with Joulemeter, published Mar. 10, 2013, downloaded from https://www.trishtech.com/2013/03/calibrate-pc-power-consumption-with-joulemeter/.*

M. Soper, Easy Windows 8.1, published Oct. 31, 2013, selected excerpts (Year: 2013).*

Japanese Office Action for corresponding Japanese Application No. 2014-174776 dated Apr. 3, 2018.

Decision of Rejection dated Sep. 11, 2018 for corresponding Japanese Application No. 2014-174776.

* cited by examiner

FIG.5

| APPARATUS No. | INSTALLATION LOCATION | CONSUMPTION POWER TARGET VALUE | DATE/TIME ZONE | CONSUMPTION POWER TOTALED VALUE | USE RATE |
|---|---|---|---|---|---|
| 300 | EAST SIDE ON 1ST F | 1000 | YYYYMMDD H1:MM:SS | 300 | 30% |
| | | | YYYYMMDD H2:MM:SS | 850 | 85% |
| | | | YYYYMMDD H3:MM:SS | 1250 | 125% |
| | | | .. | .. | .. |
| | | | YYYYMMDD HH:MM:SS | 5678 | ○○% |
| | | | .. | .. | .. |
| 301 | WEST SIDE ON 1ST F | 1000 | YYYYMMDD HH:MM:SS | 2345 | ○○% |
| | | | .. | .. | .. |
| 302 | EAST SIDE ON 2ND F | 800 | YYYYMMDD HH:MM:SS | 2345 | ○○% |
| .. | .. | .. | .. | .. | .. |

| | | DISPLAY ITEM | | | | | |
|---|---|---|---|---|---|---|---|
| DISPLAY PATTERN | USE RATE RANGE | WIDGET TYPE | STATUS | MESSAGE | USE RATE DISPLAY SIZE | DISPLAY POSITION | DISPLAY INFORMATION | PART ELEMENT |
| 1 | 0~40% | A | GOOD | 〖GOOD. Further keep in mind saving energy.〗 | AA | BACKGROUND: RC<br>STATUS: RC S (IN)<br>MESSAGE: B S (IN)<br>USE RATE: LC S (IN) | IN OPERATION: NO DISPLAY, NOT IN OPERATION: DISPLAY IN RIGHT UNDER SIDE | ·BACKGROUND A<br>·STATUS A<br>·MESSAGE A<br>·USE RATE A |
| 2 | 41~70% | B | FAIRLY GOOD | 〖FAIRLY GOOD. Further keep in mind saving energy.〗 | AA | BACKGROUND: RC<br>STATUS: RC S (IN)<br>MESSAGE: B M (IN)<br>USE RATE: LC M (IN) | IN OPERATION: NO DISPLAY, NOT IN OPERATION: DISPLAY IN RIGHT UNDER SIDE | ·BACKGROUND B<br>·STATUS B<br>·MESSAGE B<br>·USE RATE B |
| 3 | 71% OR MORE | C | CAUTION | 〖CAUTION. Consumption power approaches target value.〗 | BB | BACKGROUND: RC<br>STATUS: RC M (IN)<br>MESSAGE: B M (IN)<br>USE RATE: LC M (IN) | IN OPERATION: NO DISPLAY, NOT IN OPERATION: DISPLAY IN HALF SCREEN SIZE | ·BACKGROUND C<br>·STATUS C<br>·MESSAGE C<br>·USE RATE C |
| 4 | 101% OR MORE | D | WARNING | 〖Consumption power exceeds target value. Turn off unnecessary equipment.〗 | CC | BACKGROUND: C<br>STATUS: C L (IN)<br>MESSAGE: B L (IN)<br>USE RATE: LC L (IN) | IN OPERATION: NO DISPLAY, NOT IN OPERATION: DISPLAY IN FULL SCREEN SIZE | ·BACKGROUND D<br>·STATUS D<br>·MESSAGE D<br>·USE RATE D |

Notes
RC: Right side of Center    M: Middle
S: Small    C: Center
(IN): in background    L: Large
B: Bottom (under) side
LC: Left side of Center

| DISPLAY PATTERN | USE RATE RANGE | DISPLAY ITEM ||||| PART ELEMENT | DISPLAY MANNER |
|---|---|---|---|---|---|---|---|---|
| | | WIDGET TYPE | STATUS | MESSAGE | USE RATE DISPLAY SIZE | DISPLAY POSITION | | |
| 1 | 0~40% | A1 | GOOD | 〖GOOD. Further keep in mind saving energy.〗 | DD | BACKGROUND: NO DISPLAY STATUS: U S MESSAGE: U S USE RATE: U S | • STATUS A1 • MESSAGE A1 • USE RATE A1 | SCROLL |
| 2 | 41~70% | B1 | FAIRLY GOOD | 〖FAIRLY GOOD. Further keep in mind saving energy.〗 | DD | BACKGROUND: NO DISPLAY STATUS: U S MESSAGE: U S USE RATE: U S | • STATUS B1 • MESSAGE B1 • USE RATE B1 | SCROLL |
| 3 | 71% OR MORE | C1 | CAUTION | 〖CAUTION. Consumption power approaches target value.〗 | B | BACKGROUND: NO DISPLAY STATUS: U S MESSAGE: U S USE RATE: U S | • STATUS C1 • MESSAGE C1 • USE RATE C1 | SCROLL WITH BLINKING |
| 4 | 101% OR MORE | D1 | WARNING | 〖Consumption power exceeds target value. Turn off unnecessary equipment.〗 | C | BACKGROUND: C STATUS: U S MESSAGE: U S USE RATE: U S | • BACKGROUND D1 • STATUS D1 • MESSAGE D1 • USE RATE D1 | SCROLL WITH BLINKING POP UP DURING COPYING |

Notes
U: Upper side
S: Small

FIG.8

| DISPLAY PATTERN | USE RATE RANGE | WIDGET TYPE | DISPLAY ITEM ||||| 212-s |||
| | | | STATUS | MESSAGE | USE RATE DISPLAY SIZE | DISPLAY POSITION | PART ELEMENT | DISPLAY MANNER |
| --- | --- | --- | --- | --- | --- | --- | --- | --- |
| 1 | 0~40% | A2 | GOOD | 〖GOOD. Further keep in mind saving energy.〗 | DD | BACKGROUND: NO DISPLAY STATUS: U S MESSAGE: U S USE RATE: U S | ·STATUS A2 ·MESSAGE A2 ·USE RATE A2 | SCROLL |
| 2 | 41~70% | B2 | FAIRLY GOOD | 〖FAIRLY GOOD. Further keep in mind saving energy.〗 | DD | BACKGROUND: NO DISPLAY STATUS: U S MESSAGE: U S USE RATE: U S | ·STATUS B2 ·MESSAGE B2 ·USE RATE B2 | SCROLL |
| 3 | 71% OR MORE | C2 | CAUTION | 〖CAUTION. Consumption power approaches target value.〗 | B | BACKGROUND: NO DISPLAY STATUS: U S MESSAGE: U S USE RATE: U S | ·STATUS C2 ·MESSAGE C2 ·USE RATE C2 | SCROLL WITH BLINKING |
| 4 | 101% OR MORE | D2 | WARNING | 〖Consumption power exceeds target value. Turn off unnecessary equipment.〗 | C | BACKGROUND: C STATUS: U S MESSAGE: U S USE RATE: U S | ·BACKGROUND D2 ·STATUS D2 ·MESSAGE D2 ·USE RATE D2 | SCROLL WITH BLINKING POP UP AFTER SCANNING |

Notes
U: Upper side
S: Small
C: Center

FIG.16

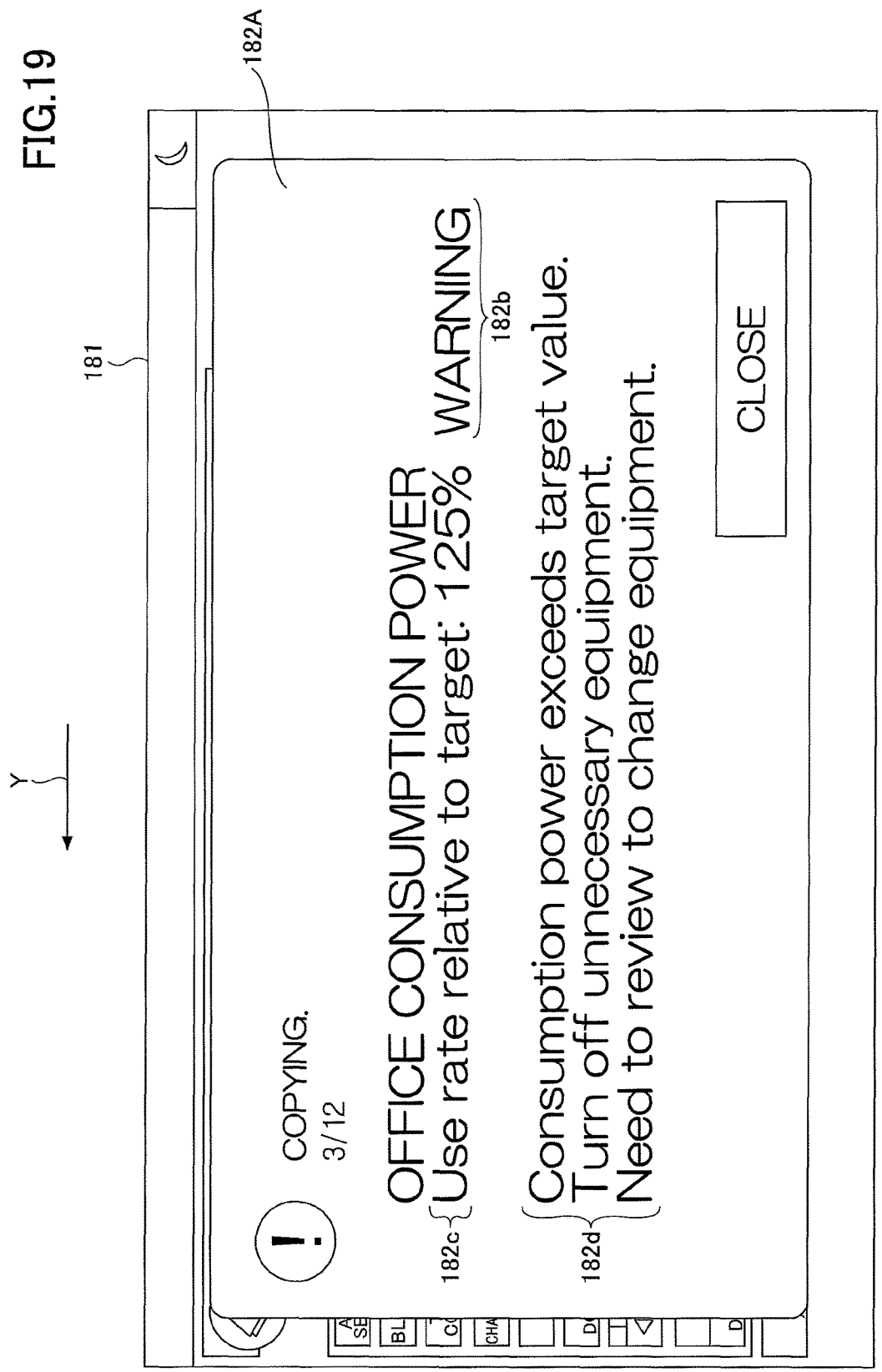

FIG.20

OFFICE CONSUMPTION POWER Use rate relative to target: 30% GOOD. Further keep in mind saving energy.

SCANNER

READY TO READ
SET DRAFT AND DESIGNATE DESTINATION

DOCUMENT ACCUMULATION | SEARCH FOR DESTINATION | PREVIEW | TRANSMIT RESULT /STOP | SETTING CHECK

No. OF DESTINA-TIONS 0 | REMAINING MEMORY 100%

BLACK AND WHITE:
CHARACTER
·FIGURE TABLE
200dpi
AUTO DETECT

READING CONDITIONS

AUTO DENSITY

ONE-SIDED DRAFT

FEED DRAFT

FILE FORMAT /FILE NAME

DESIGNATE ACCUMULATED DOCUMENT

MAIL  FOLDER

MAIL DESTINATION : 0

DESTINATION REGISTRATION

REGISTRATION No. | DIRECT INPUT | DESTINATION HISTORY | To | Cc | Bcc

COMMON USE | A | KA | SA | TA | NA | HA | MA | YA | RA | WA | CHANGE

[00001] | [00005] | [00006] | [00007] | [00008] | [00009]

[00012] KATO | [00013] KA1

MAIN TEXT | SUBJECT NAME | SECURITY | TRANSMITTER | RECEPTION ACKNOWLEDGEMENT

CALL PROGRAM /REGISTRATION/CHANGE | INTERRUPTION COPY | SIMPLE SCREEN

201

202 { 202c  202b  202d }

Y

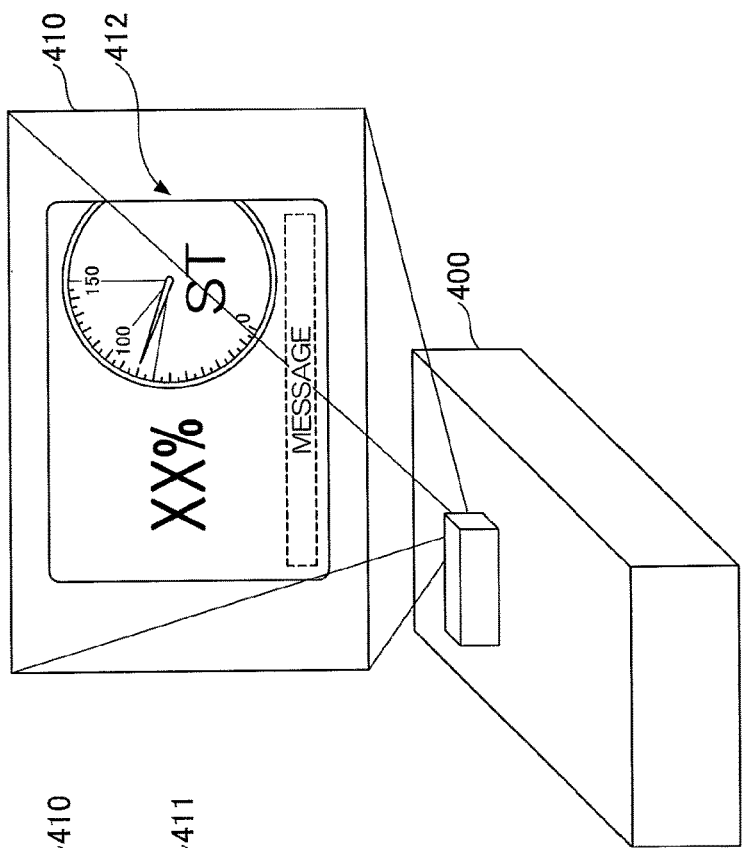
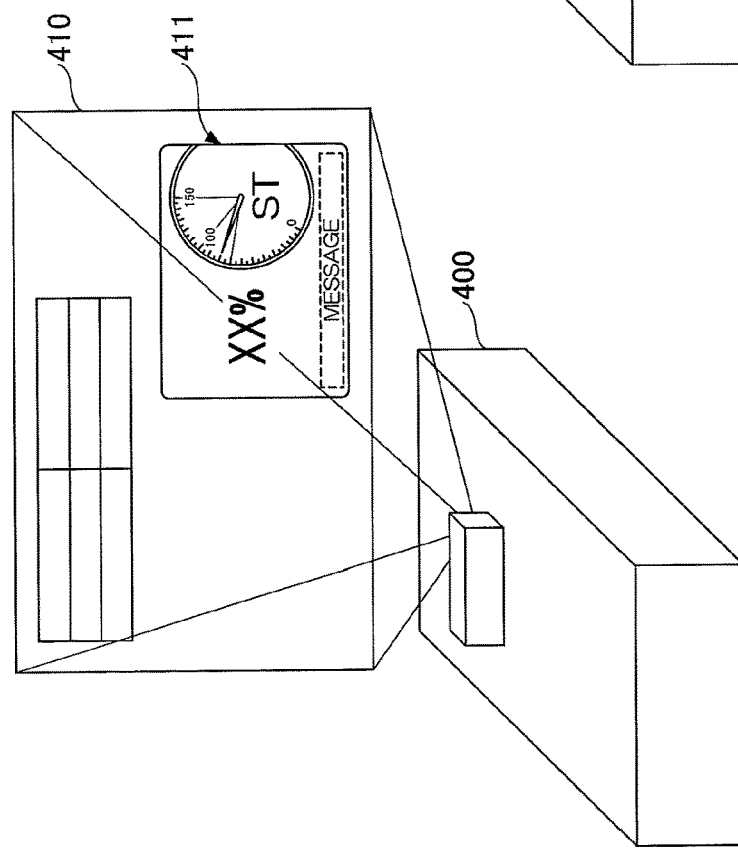

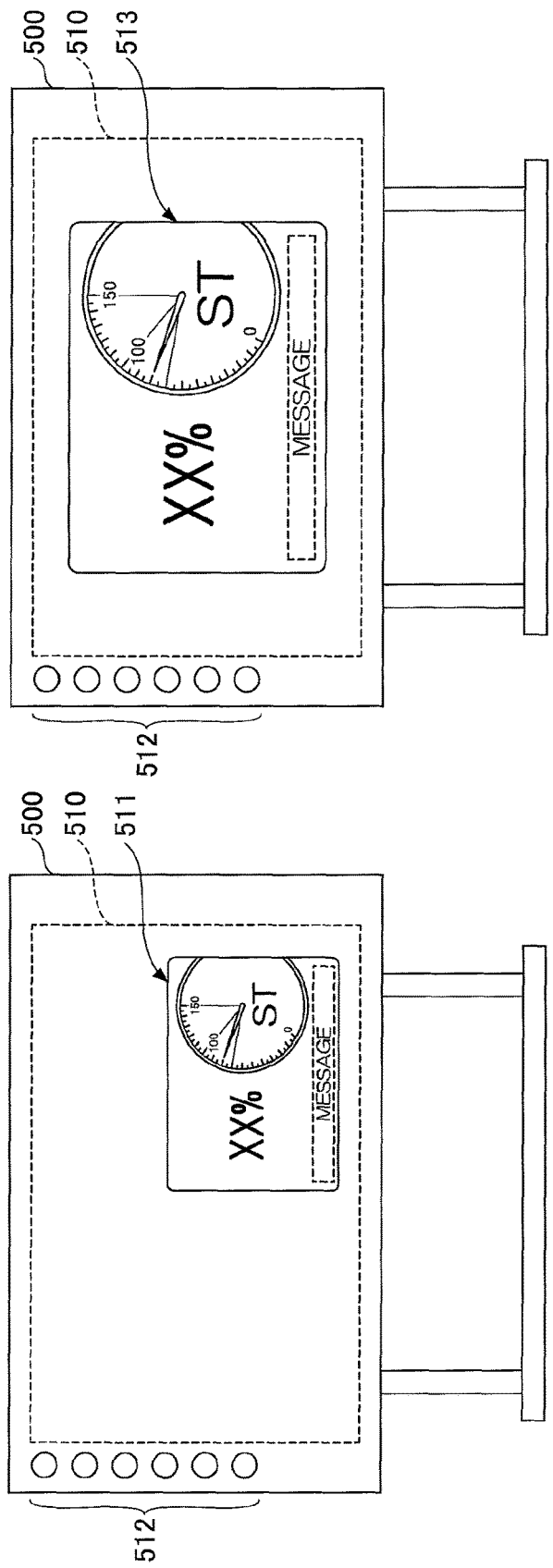

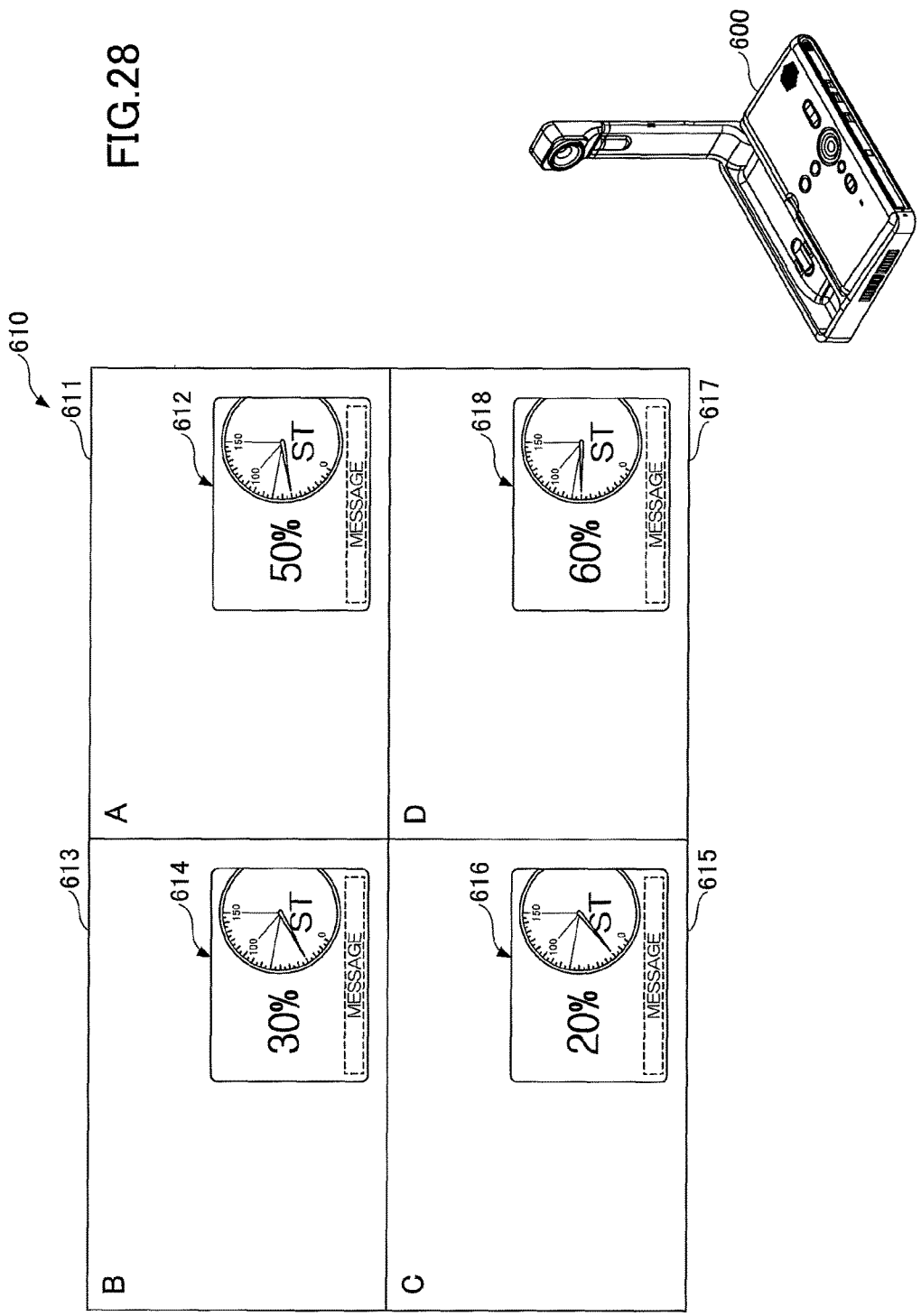

POWER DISPLAY SYSTEM, IMAGE PROCESSING APPARATUS, AND USER INTERFACE

CROSS-REFERENCE TO RELATED APPLICATIONS

The present application is based on and claims the benefit of priority under 35 U.S.C § 119 of Japanese Patent Application No. 2014-174776 filed Aug. 29, 2014, the entire contents of which are hereby incorporated herein by reference.

BACKGROUND OF THE INVENTION

1. Field of the Invention

The present invention generally relates to a power display system, an image processing apparatus, and a user interface.

2. Description of the Related Art

Recently due to various Public Relations (PRs) efforts and promotions, people have become more and more conscious of reducing (saving) power (energy consumption), so that various measures have been taken to reduce power in business offices, houses, public facilities, transportation facilities including trains and buses, etc.

As one of the measures, for example, a technique is known in which power (energy consumption) is measured on a plug basis so that the energy consumption is managed on a personal basis.

Reference is made to Japanese Laid-open Patent Publication No. 2013-99004.

SUMMARY OF THE INVENTION

According to an aspect of the present invention, a power display system includes an electronic apparatus and a server connected to an electronic apparatus group including the electronic apparatus. Further, the power display system includes a calculation unit totaling consumption power by the electronic apparatus group and calculating a ratio of the totaled consumption power to a target value of the consumption power, and a display control unit displaying a display part, which indicates a use status of power, in a display area of the electronic apparatus in a display manner which corresponds to the ratio.

BRIEF DESCRIPTION OF THE DRAWINGS

Other objects, features, and advantages of the present invention will become more apparent from the following description when read in conjunction with the accompanying drawings, in which:

FIG. 5 is a drawing illustrating an example of an apparatus management table;

FIG. 6 is a drawing illustrating an example of a use status table;

FIG. 7 is a first drawing illustrating an example of a display control table;

FIG. 8 is a second drawing illustrating an example of a display control table;

FIG. 16 is a first drawing illustrating an example of an operation screen of a copy process displayed on the image processing apparatus;

FIG. 19 is a fourth drawing illustrating an example of the operation screen of the copy process displayed on the image processing apparatus;

FIG. 20 is a first drawing illustrating an example of an operation screen of a scanning process displayed on the image processing apparatus;

FIGS. 26A and 26B are drawings illustrating a case where an electronic apparatus is a projector;

FIGS. 27A and 27B are drawings illustrating a case where the electronic apparatus is an electronic whiteboard; and FIG. 28 is a drawing illustrating a case where the electronic apparatus is a communication terminal included in a video conference system.

DETAILED DESCRIPTION OF THE PREFERRED EMBODIMENTS

In related technologies, in a business office, etc., it is difficult for an employee alone to know what is the current energy consumption in the office to take some measures to reduce energy consumption. Further, it is also difficult to make a user (employee) who is not conscious of reducing power (energy consumption) to understand the current use status of power. Therefore, it is difficult to promote measures to reduce energy consumption. It is possible to introduce a system to display the current use status of power, etc., on business personal computers of the employees. However, the introduction cost of such a system is high.

In this regard, according to a technique disclosed herein, it becomes easier for an employee to know the power use status (energy consumption status).

First Embodiment

Figure 1:
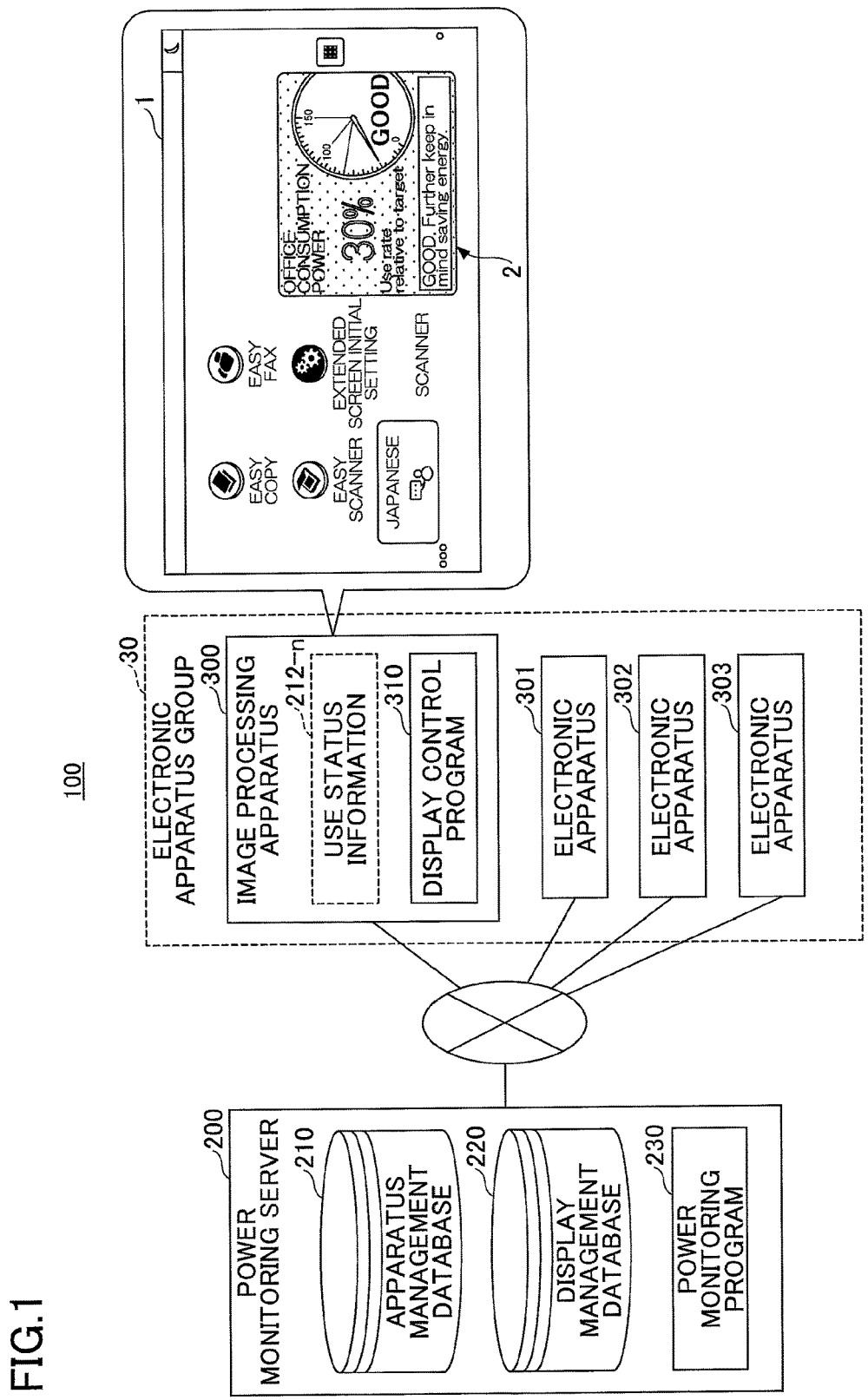
FIG. 1 is a drawing illustrating an example of a system configuration of a power (energy consumption) display system.

A first embodiment is described with reference to the accompanying drawings. FIG. 1 illustrates an example system configuration of a power (energy consumption) display system.

A power (energy consumption) display system 100 includes a power (energy consumption) monitoring server 200 and an electronic apparatus group 30 which is connected to the power monitoring server 200 via a network.

The electronic apparatus group 30 in this embodiment refers to the apparatuses in a business office(s), etc., and includes an electronic apparatus which is shared by users in the business office(s). More specifically, in this embodiment, for example, it is assumed that the apparatuses are installed in one office.

In the power display system 100, the electronic apparatus group 30 includes at least one image processing apparatus 300 which is shared among a plurality of users. Further, in the electronic apparatus group 30, for example, an electronic apparatus 301 may be another image processing apparatus. Further, an electronic apparatus 302 may be telephone equipment, etc. Further, an electronic apparatus 303 may be an air-conditioning unit (system), etc. Further, the electronic apparatus group 30 may include lighting equipment, a computer for personal use, etc. Further, the electronic apparatus group 30 may include a projector and an electronic whiteboard which are shared by users in office, a communication terminal, etc.

In the power display system 100 according to this embodiment, the power monitoring server 200 monitors energy consumption in the electronic apparatus group 30.

Further, the image processing apparatus 300 displays a widget 2, which indicates a power use state in the electronic apparatus group 30 in the office, on a display area 1 such as an operation panel.

The term "widget" in this embodiment refers to a group of part elements included in a graphical interface. More specifically, the term "widget" in this embodiment refers to a display part which indicates the power use status (energy consumption status). Details of the part elements included in the widget 2 are described below.

The power monitoring server 200 in this embodiment includes an apparatus management database 210 and a display management database 220. Further, a power (energy consumption) monitoring program 230 is installed in the power monitoring server 200.

The power monitoring server 200 in this embodiment refers to the apparatus management database 210 and totals (calculates) the power consumption (energy consumption) in the electronic apparatus group 30, and provides use status information, which indicates the power use status (energy consumption status), to the image processing apparatus 300. The use status information includes a part element which is included in the widget.

Further, the power monitoring server 200 in this embodiment refers to the display management database 220 and provides information, which is related to a display of the widget in accordance with a process performed in the image processing apparatus 300, to the image processing apparatus 300.

In the image processing apparatus 300 in this embodiment, a display control program 310 is installed which controls display of the widget 2 in the display area 1 in accordance with use status information 212-$n$ which is acquired from the power monitoring server 200. Here, "n" in the "use status information 212-$n$" denotes a display pattern which is described below.

As described above, in the power display system 100 according to this embodiment, the power monitoring server 200 monitors energy consumption in the office, and causes the image processing apparatus 300 to display the widget 2 which indicates the power use status. In other words, in the power display system 100 according to this embodiment, a display part is displayed in the display area 1 of the image processing apparatus 300 in a display manner in accordance with a ratio of a consumption power totaled value (energy consumption totaled (calculated) value) to a consumption power target value (energy consumption target value).

In this embodiment, due to this display, it becomes possible to make an employee who uses the image processing apparatus 300 to easily know the power use status. Therefore, it becomes possible to prompt a user who is not conscious of reducing energy consumption to take some measures to reduce energy consumption.

Figure 2:
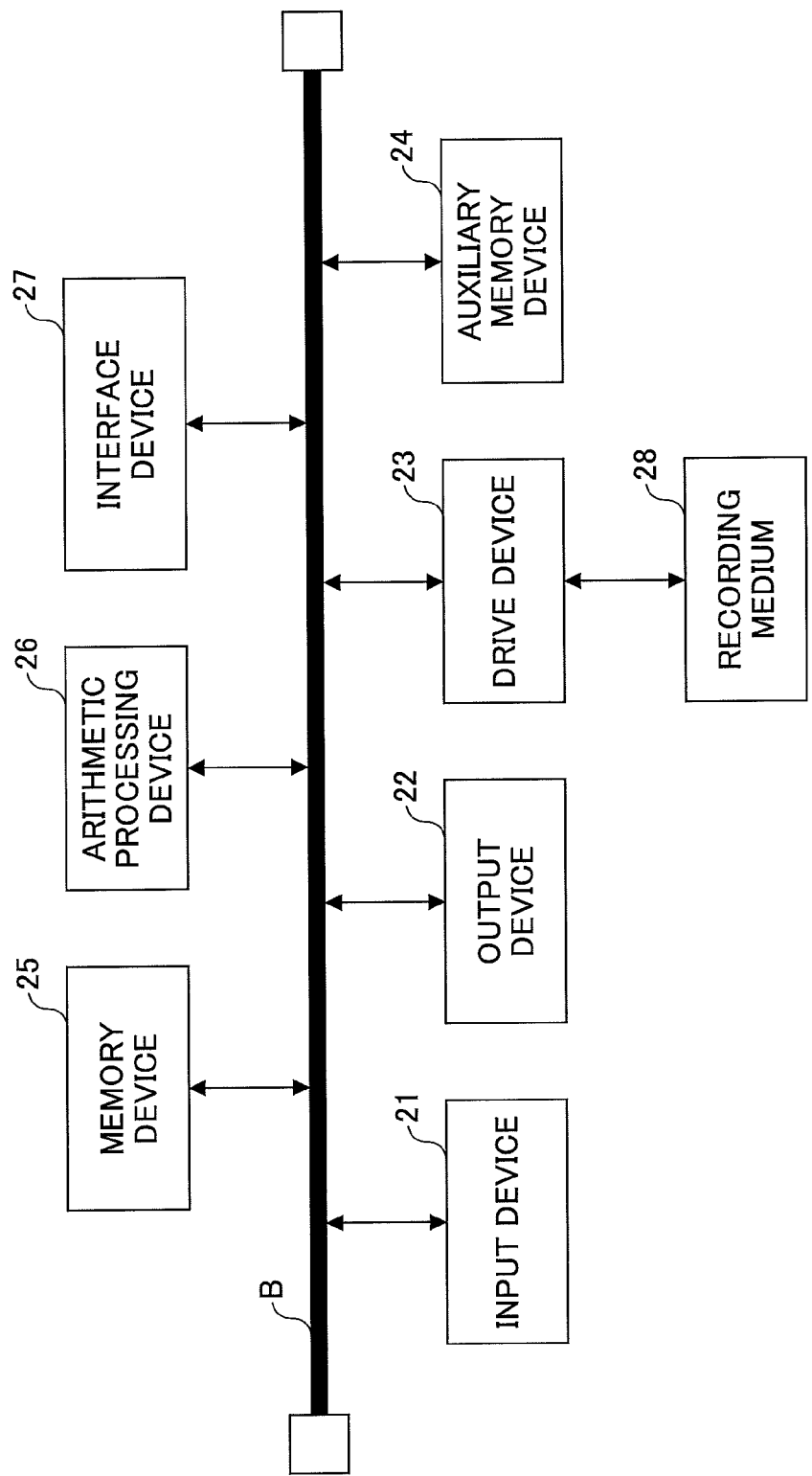
FIG. 2 is a drawing illustrating an example of a hardware configuration of a power monitoring server.

FIG. 2 illustrates an example hardware configuration of the power monitoring server 200. The power monitoring server 200 in this embodiment includes an input device 21, an output device 22, a drive device 23, an auxiliary memory device 24, a memory device 25, an arithmetic processing device 26, and an interface device 27, which are connected to each other via a bus B.

The input device 21 is, for example, a keyboard, a mouse, etc., and is used to input various signals. The output device 22 is, for example, a display, etc., and is used to output various information.

The interface device 27 includes a modem, a Local Area Network (LAN) card, etc., and is used to connect to a network.

The power monitoring program 230 is a part of various programs which control the power monitoring server 200. The power monitoring program 230 is provided by, for example, distributing a recording medium 28 or downloading via a network. As the recording medium 28 storing the power monitoring program 230, various types of recording medium can be used including a recording medium which optically or magnetically stores information such as a Compact Disc Read Only Memory (CD-ROM), a flexible disk, a magnetooptical disk, etc., or a semiconductor memory which electronically stores information such as a ROM, a flash memory, etc.

Further, when the recording medium 28 storing the power monitoring program 230 is set in the drive device 23, the power monitoring program 230 is installed in the auxiliary memory device 24 from the recording medium 28 via the drive device 23. The power monitoring program 230, which is downloaded from a network, is installed in the auxiliary memory device 24 via the interface device 27.

The auxiliary memory device 24 stores the installed power monitoring program 230, and further stores necessary files, data, etc. The memory device 25 reads the power monitoring program 230 from the auxiliary memory device 24 when the computer starts up, and stores it therein. Then, the arithmetic processing device 26 realizes various processing described below in accordance with the power monitoring program 230 stored in the memory device 25.

Figure 3:
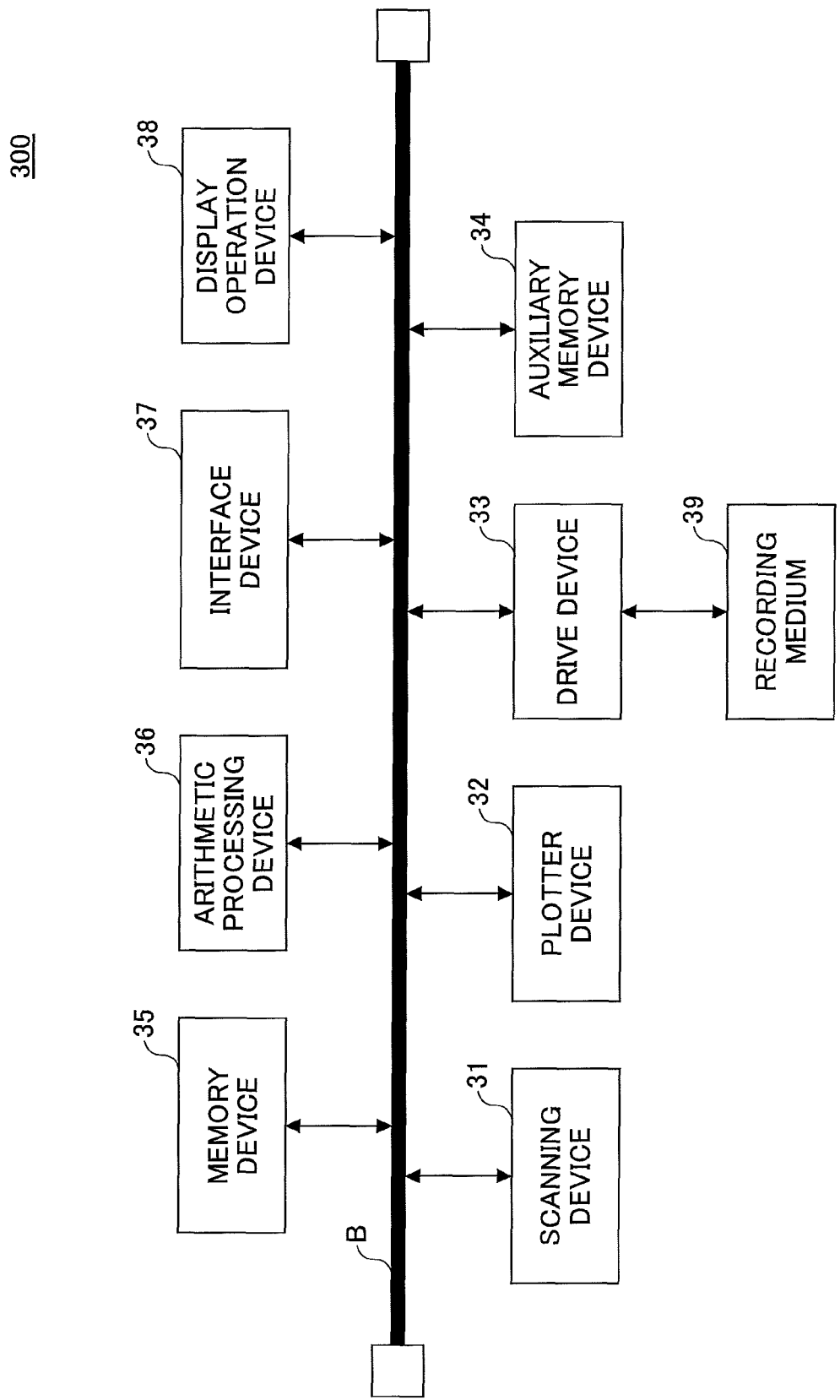
FIG. 3 is a drawing illustrating an example of a hardware configuration of an image processing apparatus.

FIG. 3 illustrates an example hardware configuration of the image processing apparatus 300. The image processing apparatus 300 in this embodiment includes a scanning device 31, a plotter device 32, a drive device 33, an auxiliary memory device 34, a memory device 35, an arithmetic processing device 36, an interface device 37, and a display operation device 38.

The scanning device 31 reads an image formed on a print medium to generate image data thereof, and thus, is used to input image data. The plotter device 32 is used to form and output an image based on the image data.

The interface device 37 includes a modem, a LAN card, etc., and is used to connect to a network.

The display operation device 38 is, for example, a touch panel, and is used to input operations relative to the image processing apparatus 300 and display information.

The display control program 310 is a part of various programs which control the image processing apparatus 300. The display control program 310 is provided by, for example, distributing a recording medium 39 or downloading via a network. As the recording medium 39 storing the display control program 310, various types of recording medium can be used including a recording medium which optically or magnetically stores information such as a CD-ROM, or a flexible disk, a magnetooptical disk, etc., a semiconductor memory which electronically stores information such as a ROM, a flash memory, etc.

Further, when the recording medium 39 storing the display control program 310 is set in the drive device 33, the display control program 310 is installed in the auxiliary memory device 34 from the recording medium 39 via the drive device 33. The display control program 310, which is downloaded from a network, is installed in the auxiliary memory device 34 via the interface device 37.

The auxiliary memory device 34 stores the installed display control program 310, and further stores necessary files, data, etc. The memory device 35 reads the display control program 310 from the auxiliary memory device 34 when the computer starts up, and stores therein. Then, the arithmetic processing device 36 realizes various processing described below in accordance with the display control program 310 stored in the memory device 35.

Figure 4:
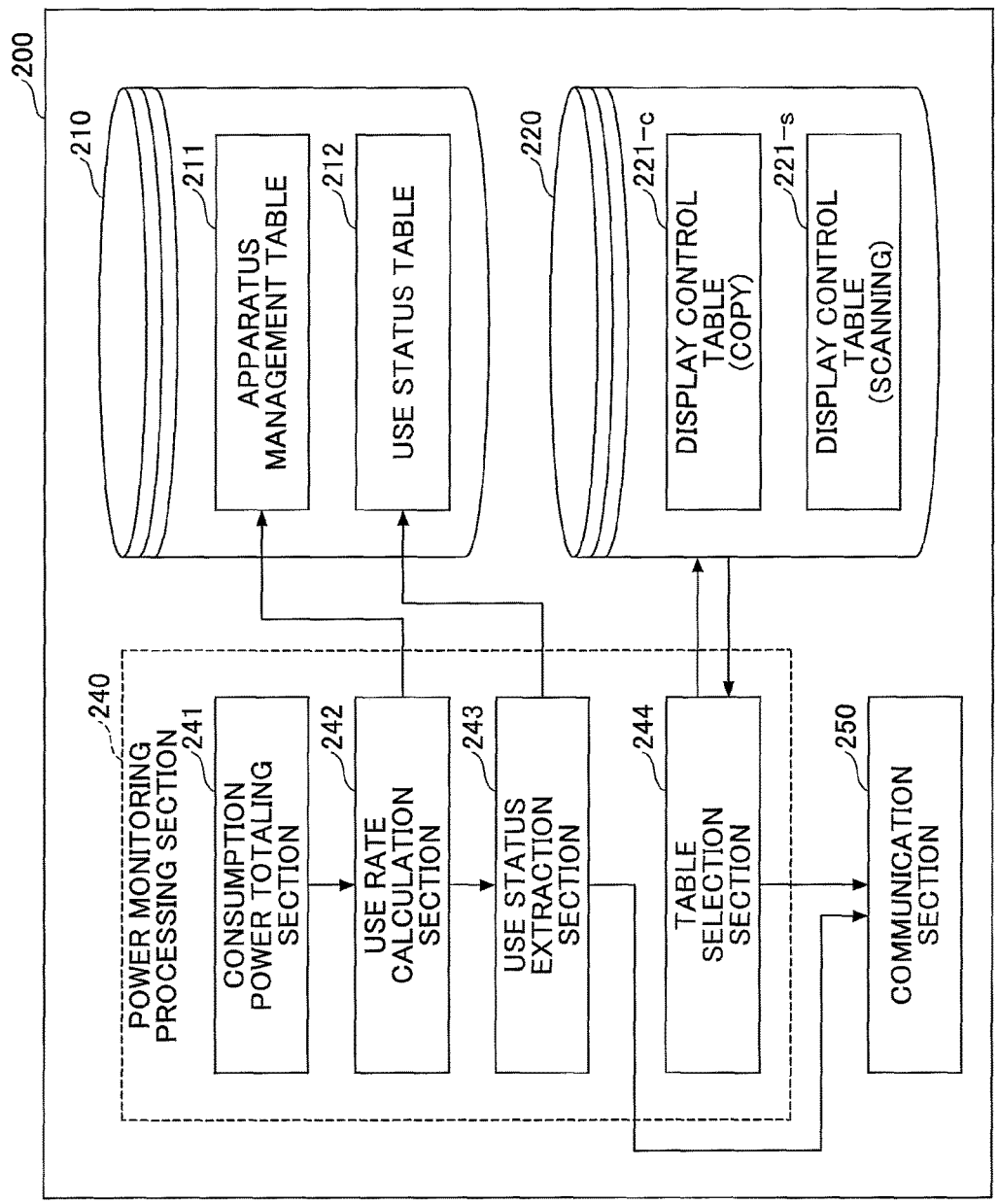
FIG. 4 is a drawing illustrating functions of the power monitoring server.

Next, the functions of the power monitoring server 200 according to this embodiment are described with reference to FIG. 4. FIG. 4 illustrates the functions of the power monitoring server 200.

Before functions of the power monitoring server 200 are described, the databases included in the power monitoring server 200 are described.

The apparatus management database 210 in this embodiment includes (stores) an apparatus management table 211 and a use status table 212.

The apparatus management table 211 is a table to manage the electronic apparatuses included in the electronic apparatus group 30 which is connected to the power monitoring server 200. The use status table 212 is a table to display a use status of energy consumption relative to the electronic apparatus group 30.

In the apparatus management database 210 of FIG. 4, the number of the use status table 212 stored therein is one. Note that, however, it is preferable that in the apparatus management database 210, the use status table 212 be provided each for the electronic apparatuses included in the electronic apparatus group 30. The use status table 212 of FIG. 4 is provided to cause the image processing apparatus 300 to display the use status of energy consumption (consumption power), and is a use status table which corresponds to the image processing apparatus 300.

The display management database 220 in this embodiment includes (stores) a display control table 221-*c* and a display control table 221-*s*.

The display control table 221-*c* is a table which corresponds to a case where the process to be executed in the image processing apparatus 300 is a copy process, and is used to display the use state of power when the copy process is performed in the image processing apparatus 300.

The display control table 221-*s* is a table which corresponds to a case where the process to be executed in the image processing apparatus 300 is a scanning process, and is used to display the use state of power when the scanning process is performed in the image processing apparatus 300.

Further, in this embodiment, the display management database 220 includes only the display control table 221-*c* and the display control table 221-*s*. Note that, however, the present invention is not limited thereto. For example, the display management database 220 may include display control tables which correspond to various processes that can be executed in the image processing apparatus 300. More specifically, the display management database 220 may include display control tables which correspond to the applications included in the image processing apparatus 300. In other words, the display management database 220 may include display control tables which indicate display manners of the display parts corresponding to the functions which are realized in the image processing apparatus 300.

Further, in the following, when the display control table 221-*c* and the display control table 221-*s* are not distinguished from each other, the term "display control table 221" is used.

Details of the tables included in the power monitoring server 200 are described below.

The power monitoring server 200 in this embodiment includes a power (energy consumption) monitoring processing section 240 and a communication section 250. The power monitoring processing section 240 is a processing section that is realized by executing the power monitoring program 230 by the arithmetic processing device 26. The communication section 250 is a processing section that realizes the communications between the power monitoring server 200 and an external apparatus.

The power monitoring processing section 240 in this embodiment includes a consumption power totaling section 241, a use rate calculation section 242, a use status extraction section 243, and a table selection section 244.

The processes by the consumption power totaling section 241, the use rate calculation section 242, and the use status extraction section 243, which are described below, are performed every predetermined time period by the power monitoring server 200.

The consumption power totaling section 241 calculates a total (totals) of power consumed by the apparatuses, and stores the calculated (totaled) value of the consumption power (energy consumption) in the apparatus management database 210. More specifically, the power display system 100 in this embodiment may include sensors, etc., to total the consumption power in the electronic apparatus group 30, so that the consumption power totaling section 241 totals power detected by the sensors, etc.

The use rate calculation section 242 refers to a target value of the consumption power which is set in the apparatus management table 211 in advance, and calculates a use rate of the consumption power, which is totaled by the consumption power totaling section 241, to the target value.

The use status extraction section 243 extracts the use status information from the use status table 212 based on the use rate calculated by the use rate calculation section 242. In this embodiment, the extracted use status information is transmitted to the image processing apparatus 300.

Based on the report from the image processing apparatus 300, the table selection section 244 selects a display control table to be transmitted to the image processing apparatus 300 from the display management database 220.

The details of the processes performed by the use rate calculation section 242, the use status extraction section 243, and the table selection section 244 are described below.

Next, with reference to FIGS. 5 through 8, the tables included in the power monitoring server 200 are described. FIG. 5 illustrates an example of the apparatus management table 211.

The apparatus management table 211 includes information items an "apparatus No." in association with an "installation location", a "consumption power target value", a "date/time zone", a "consumption power totaled value", and the "use rate".

The value of the item "apparatus No." identifies the electronic apparatus connected to the power monitoring server 200. The value of the item "installation location" indicates the location where the electronic apparatus is installed. The value of the item "consumption power target value" herein refers to the target value of the consumption power in the corresponding time zone. The value of the item "date/time zone" refers to the time zone of the date. According to this embodiment, the "consumption power totaled value" ("consumption power target value") is set for each time zone.

The value of the item "consumption power totaled value" indicates the consumption power which is totaled by the consumption power totaling section 241. In this embodiment, for example, the value of the item "consumption power totaled value" may be overwritten whenever the consumption power totaling section 241 totals the consumption power. The value of the "use rate" refers to a ratio of the "consumption power totaled value" to the "consumption power target value". In this embodiment, for example, the value of the "use rate" may be overwritten whenever the use rate calculation section 242 calculates the "use rate".

Here, the "consumption power target value" is described. According to this embodiment, the "consumption power target value" refers to a target value of the accumulated value in a time range, for example, from start time set in advance until the consumption power is totaled.

In an example of FIG. 5, the "apparatus No." of the image processing apparatus 300 is 300, and the image processing apparatus 300 is installed on the east side of the first floor (1F). On the east side of 1F, the "consumption power target value" in the time zone which is from H1(hour) MM(minute) SS(second) of YYY(year) MM(month) DD(day) to H2(hour) MM(minute) SS(second) of YYY(year) MM(month) DD(day) is 1000 (1234) W. On the other hand, the value of the "consumption power totaled value" which is totaled in this time zone is 300 W. Thus, the value of the "use rate" is 30%.

Next, with reference to FIG. 6, the use status table 212 is described. FIG. 6 illustrates an example of the use status table 212.

In this embodiment, the use status table 212 is referred to when the display pattern of the widget 2 in the image processing apparatus 300 is controlled.

As the information items of the use status table 212 according to this embodiment, there are a "display pattern" in association with a "use rate range", a "display item", a "display information", and a "part element". In the following description in this embodiment, the information in which the value of the item "display pattern" is association with the values of other items is called the "use status information".

The value of the item "display pattern" identifies the display pattern of the widget 2. The item "use rate range" indicates the range of the use rate. The item "display item" indicates the information related to the display of the widget 2. Details of the "display item" are described below.

The item "display information" indicates whether there exists a display of the widget 2 (YES) or not (NO) in accordance with a state of the image processing apparatus 300. The term the "state of the image processing apparatus 300" refers to a state, for example, whether the image processing apparatus 300 is operated by a user. The value of the item "part element" refers to the image data of the part element included in the widget 2.

In the following, the item "display item" is described. As detailed items thereof, the "display item" includes items "widget type", "status", "message", "use rate display size", and "display position". The value of the item "widget type" refers to a type of the widget. The value of the item "status" indicates a use rate status of power. The item "message" refers to a message (text data) to be displayed corresponding to the "status".

The value of the item "use rate display size" refers to the display sizes of the figures indicating the use rate and the unit thereof. The values of the item "display position" indicate the respective display positions of the background, the "status", the "message", and the "use rate".

In the following, with reference to the use status table 212 of FIG. 212, the use status information 212-1 in association with the display pattern "1" is described.

In the use status information 212-1, the "use rate range" of the display pattern "1" is from 0% to 40%. In FIG. 6, when the use rate, which is calculated by the use rate calculation section 242, is within this range, the "widget type" of the widget 2 to be displayed in the image processing apparatus 300 is "A".

In the widget type "A", the "status" is "good", the "message" is "good, further keep in mind saving energy", and the "use rate display size" is "AA".

Further, the "display position" of the background is "right center (RC)". Thus, the display position of the background is on the right side of the center of the display area of the image processing apparatus 300. That is, the widget of widget type "A" is displayed on the right side of the center of the display area of the image processing apparatus 300.

Further, the "display position" of the "status" is "right center (RC) (IN)". Therefore, the "status" is displayed on the right side in the background. Further, in the example of FIG. 6, the value of the "display position" of the "status" may include the sizes of the display of the "message", "status", etc. Here, the size of the display (display size) of the "status" is "small(S)".

Similarly, the "display position" of the "message" is on the bottom (lower) side in the background (U, (IN)), and the display size of the "message" is "small(S)". The "display position" of the "use rate" is on the left side of the center in the background (LC, (IN)), and the display size of the "message" is "small(S)".

Further, in the display pattern "1", the widget is not displayed while the image processing apparatus 300 is operated, and the widget of the widget type "A" is displayed while the image processing apparatus 300 is not operated. The term "while the image processing apparatus 300 is not operated" refers to that, for example, the image processing apparatus 300 is in a wait status.

Further, the part elements included in the widget of the widget type "A" are "background "A"", "status "A"", "message "A"", and "use rate "A"". Those four part elements are respective image data sets. The widget of the widget type "A" is generated by displaying those four image data sets based on the respective values of the display items.

Further, in the following description, it is assumed that, in the use status table 212, the use status information corresponding to the display pattern "2" is use status information 212-2, the use status information corresponding to the display pattern "3" is use status information 212-3, and the use status information corresponding to the display pattern "4" is use status information 212-4.

Next, with reference to FIG. 7, the display control table 221-c is described which is stored in the display management database 220 according to this embodiment. FIG. 7 is a first drawing illustrating an example of the display control table. The display control table 221-c of FIG. 7 is a table which corresponds to a copy process in the image processing apparatus 300.

As the information items of the display control table 221-c according to this embodiment includes "display pattern", "use rate range", "display item", "part element", and "display manner". Those items of the display control table 221-c except the "display manner" are the same as the items included in the use status table 212. In the following description, the information, which includes the value of the "display pattern" in association with the values of the other items, is called "display control information".

In the display control table 221-c of FIG. 7, the "use rate range" of the pattern "1" is from 0% to 40%, and the "widget type" is "A1".

In the widget type "A1", the "status" is "good", and the "message" is "good, further keep in mind saving energy", and the "use rate display size" is "DD".

In the widget of the widget type "A1", the background is not displayed. Further, the value of the "display position" of the "status" is "U (upper side) S (small)". Therefore, the "status" is displayed on the upper side in the display area of the image processing apparatus 300, and the display size of the "status" is small. This also applies to the "message" and "use rate" because the value thereof is the same as that of the "status".

The part elements included in the widget of the widget type "A1" are "status A1", "message A1", and "use rate A1".

Further, the value of the "display manner" of the widget of the widget type "A1" is "scroll". Therefore, the display data sets of the "status A1", "message A1", and "use rate A1" in the widget of the widget type "A1" are display on the display area in a scrolling manner.

Next, with reference with FIG. 8, the display control table 221-s according to this embodiment is described. FIG. 8 is a second drawing illustrating an example of the display control table. The display control table 221-s of FIG. 8 is a table which corresponds to a scanning process in the image processing apparatus 300.

The information items and the corresponding values of the display control table 221-s are similar to those of the display control table 221-c. Therefore, repeated descriptions thereof are herein omitted.

Figure 9:
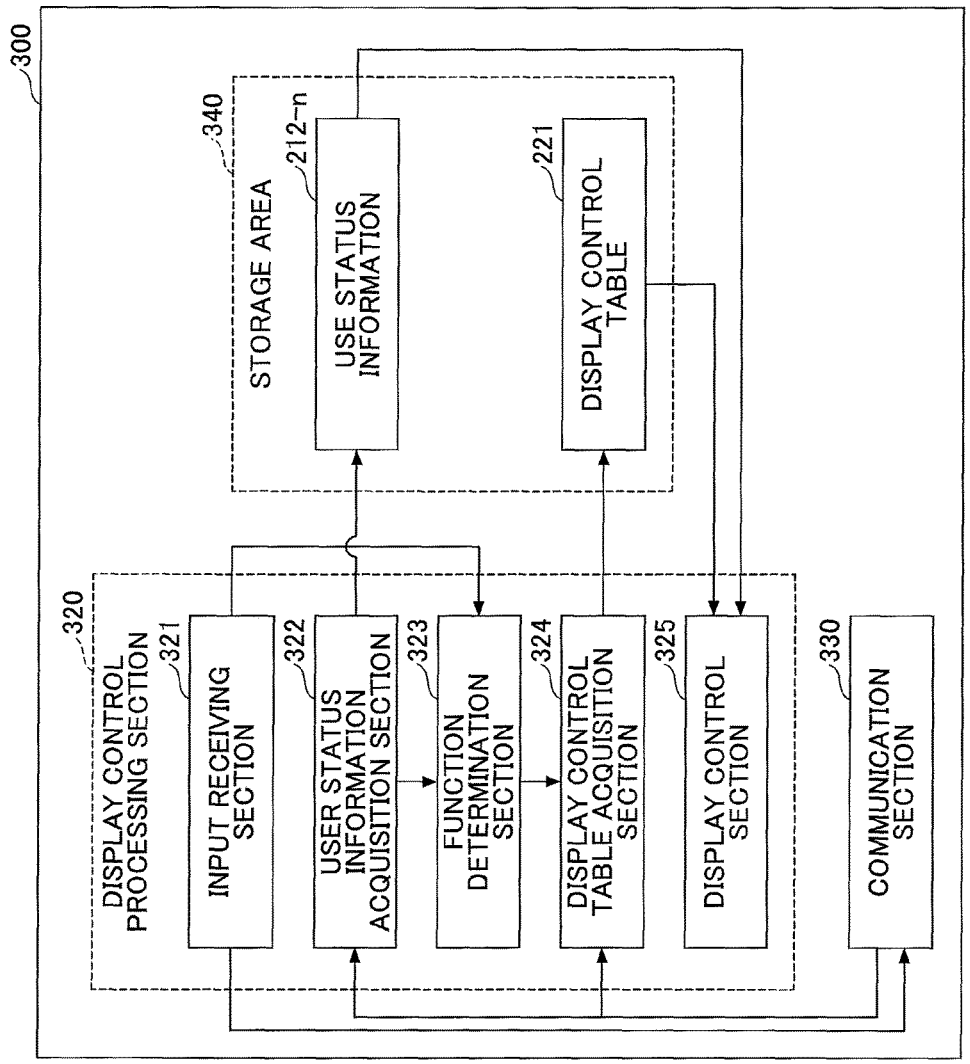
FIG. 9 is a drawing illustrating functions of the image processing apparatus.

Next, with reference to FIG. 9, the functions of the image processing apparatus 300 according to this embodiment are described. FIG. 9 illustrates the functions of the image processing apparatus 300.

The image processing apparatus 300 in this embodiment includes a display control processing section 320, and a communication section 330. The image processing apparatus 300 in this embodiment includes a storage area 340.

The display control processing section 320 is a processing section which is realized by executing the display control program 310 by the arithmetic processing device 36. The communication section 330 is a processing section which realizes communications between the image processing apparatus 300 and an external apparatus. The storage area 340 in this embodiment is provided, for example, in the memory device 35.

The display control processing section 320 includes an input receiving section 321, a use status information acquisition section 322, a function determination section 323, a display control table acquisition section 324, and a display control section 325.

The input receiving section 321 receives input of an operation on the display operation device 38 of the image processing apparatus 300. Further, the input receiving section 321 receives input of an operation of a hard key provided on the image processing apparatus 300.

The use status information acquisition section 322 acquires the use status information 212-n from the power monitoring server 200, and stores the acquired use status information 212-n in the storage area 340.

The function determination section 323 determines a type of process, which is executed by the image processing apparatus 300, based on the operation received by the input receiving section 321. More specifically, based on the operation received by the input receiving section 321, the function determination section 323 determines a type of an application (function) which is selected as an execution target in the image processing apparatus 300.

The display control table acquisition section 324 acquires the display control table 221, which corresponds to the process determined by the function determination section 323, from the power monitoring server 200, and stores the acquired display control table 221 in the storage area 340.

The display control section 325 refers to the display control table 221 stored in the storage area 340, and controls the display of the display operation device 38.

Figure 10:
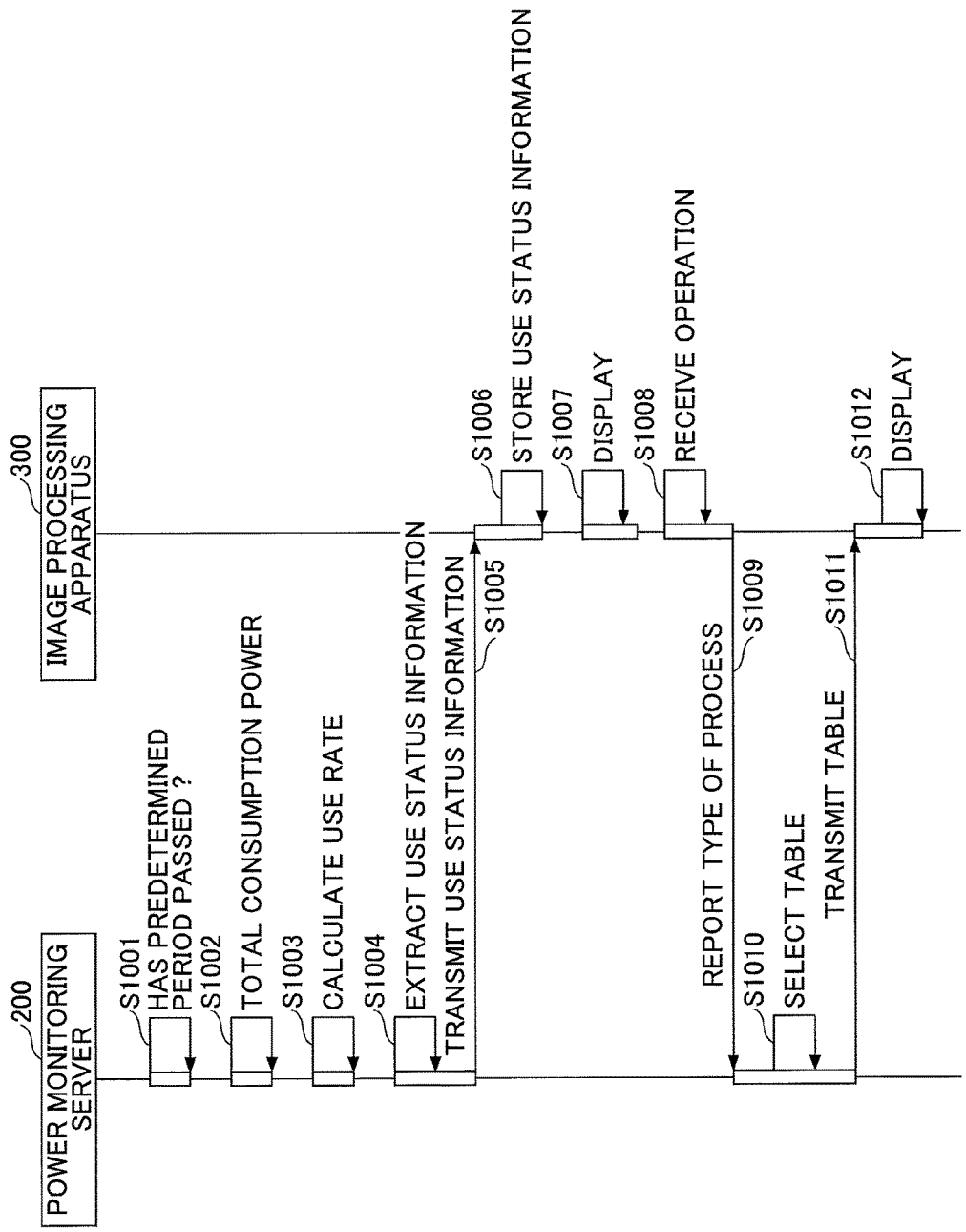
FIG. 10 is a sequence diagram illustrating operations of the power display system according to a first embodiment.

Next, with reference to FIG. 10, the operations of the power display system 100 are briefly described. FIG. 10 is a sequence diagram illustrating the operations of the power display system 100 according to the first embodiment.

In the power display system 100 in this embodiment, the consumption power totaling section 241 of the power monitoring server 200 determines that a predetermined time period has passed since the previous totaling consumption power (energy consumption) (step S101). In this embodiment, the power monitoring server 200 may total (calculate) consumption power, for example, every thirty minutes.

Next, the consumption power totaling section 241 of the power monitoring server 200 totals (calculates) consumption power in the electronic apparatus group 30 connected to the power monitoring server 200 (step S102). The totaled consumption power is stored in the apparatus management table 211 as the consumption power total value (energy consumption total value) of the time zone of the totaling.

Next, the use rate calculation section 242 of the power monitoring server 200 refers to the apparatus management table 211, and acquires the consumption power target value of the time zone of the totaling. Then, the use rate calculation section 242 calculates the ratio of the consumption power total value to the acquired consumption power target value, and stores the calculation result (ratio) in the apparatus management table 211 as the value of the use rate (step S103).

Next, the use status extraction section 243 of the power monitoring server 200 extracts the use status information, which corresponds to the use rate calculated in step S102, from the use status table 212 (step S104). Specifically, for example, when the use rate calculated in step S103 is 30%, the use status extraction section 243 extracts the use status information 212-1 whose use rate range is from 0% to 40% from the use status table 212 (see FIG. 6).

Next, the communication section 250 of the power monitoring server 200 transmits the extracted use status information to the image processing apparatus 300 (step S105). Upon receiving the use status information by the communication section 330 of the image processing apparatus 300, the communication section 330 stores the received use status information in the storage area 340 (step S106).

In the power display system 100 according to this embodiment, the processes up to step S106 are repeated every predetermined time period. Further, in the power display system 100 in this embodiment, the processes from step S107 are performed when the image processing apparatus 300 receives start-up instructions.

Here, it is assumed that the image processing apparatus 300 receives the start-up instructions in a case where, for example, the image processing apparatus 300 receives instructions to turn on the image processing apparatus 300, the image processing apparatus 300 receives instructions to change the operation mode of the image processing apparatus 300 from an energy saving mode to a normal operation mode, etc.

The image processing apparatus 300 displays on the display operation device 38 in accordance with the use status information (step S107). Next, when the image processing apparatus 300 receives an operation (step S108), the image processing apparatus 300 transmits the type of the operation (process) to the power monitoring server 200 (step S109).

The table selection section 244 of the power monitoring server 200 refers to the display management database 220, and select the display control table 221 which corresponds to the transmitted type of the process (step S110). Then, the communication section 250 of the power monitoring server 200 transmits the selected display control table 221 to the image processing apparatus 300 (step S111).

The display control table acquisition section 324 of the image processing apparatus 300 acquires the display control table 221 which is received by the communication section 330, and controls the display of the display operation device 38 based on the display control table 221 (step S112).

Figure 11:
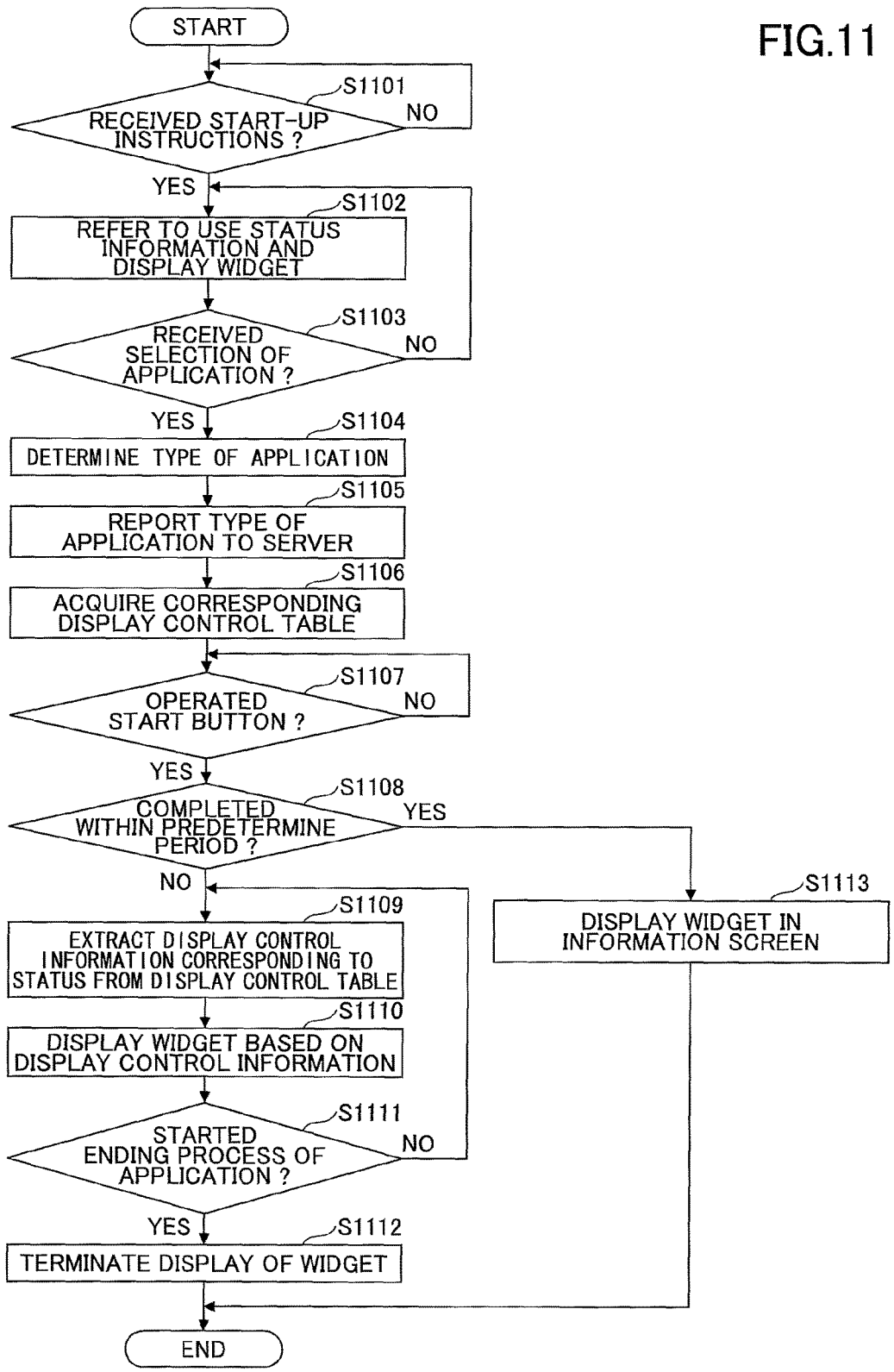
FIG. 11 is a flowchart illustrating operations of the image processing apparatus according to the first embodiment.

In the following, with reference to FIG. 11, operations of the image processing apparatus 300 are described. FIG. 11 is a flowchart illustrating operations of the image processing apparatus 300 according to the first embodiment.

The input receiving section 321 of the image processing apparatus 300 determines whether the start-up instructions are received (step S1101). When the start-up instructions are not received in step S1101, the image processing apparatus 300 waits until the start-up instructions are received.

When the start-up instructions are received in step S1101, the display control section 325 of the image processing apparatus 300 refers to the use state information in the storage area 340, and displays a wait screen, on which the widget is superimposed, in the display area of the display operation device 38 (step S1102). More specifically, the display control section 325 displays the widget in a manner such that the parts elements included in the use status information are displayed in accordance with the respective display positions. Details of the wait screen in this embodiment are described below.

Next, the input receiving section 321 of the image processing apparatus 300 determines whether selection of an application is received on the wait screen (step S1103). When any selection is not received in step S1103, the process goes back to step S1102, so that the image processing apparatus 300 continues the display of the wait screen on which the widget is superimposed.

When a selection of an application is received in step S1103, the function determination section 323 determines (identifies) the type of the selected application (step S1104). That is, the function determination section 323 determines the type of the process which is executed by the image processing apparatus 300.

Next, the image processing apparatus 300 reports the determined type of the application to the power monitoring server 200 (step S1105). Then, the image processing apparatus 300 acquires the display control table 221 which is selected based on the report by the power monitoring server 200, and stores the acquired display control table 221 in the storage area 340 (step S1106).

Next, the input receiving section 321 of the image processing apparatus 300 determine whether a start button, which is provided on the image processing apparatus 300, is operated (step S1107). Here, the start button in this embodiment refers to an operation member which is separately provided from the display operation device 38 and is the hard key. In the image processing apparatus 300 according to this embodiment, when the start key is operated, it is assumed that the execution of the process of the selected application is started.

In step S1107, when the operation of the start key is not received, the image processing apparatus 300 waits until the operation is received.

In step S1107, when the operation is received, the display control section 325 of the image processing apparatus 300 determines whether the process of the application ends within a predetermined time period (step S1108).

In step S1108, when it is determined that the process of the application ends within the predetermined time period, the process of the image processing apparatus 300 goes to step S1113. The predetermined time period may be, for example, in a range from 3 seconds to 5 seconds.

In step S1108, when it is determined that the process of the application does not end within the predetermined time period, the display control section 325 of the image processing apparatus 300 refers to the display control table 221, and extracts the status included in the use status information and the corresponding display control information (step S1109). Then, the display control section 325 of the image processing apparatus 300 display the widget, which is based on the extracted display control information, in a superimposed manner on an operation screen of the selected application (step S1110).

Next, the display control section 325 of the image processing apparatus 300 determines whether a process of ending the application is started (step S1111). In step S1111, when it is determined that the process of ending the application is not started, the process of the image processing apparatus 300 goes back to step S1109.

In step S1111, when it is determined that the process of ending the application is not started, the display control section 325 of the image processing apparatus 300 ends the display of the widget and ends the process.

Further, in step S1108, when it is determined that the process of the application ends within the predetermined time period, the display control section 325 displays an information screen after the application ends, further displays the widget, which is based on the use status information, on the information screen (step S1113), and then ends the process.

As described above, in the image processing apparatus 300 according to this embodiment, when an application is selected on the wait screen on which the widget, which is based on the use status information of the consumption power, is superimposed, another widget, which corresponds to the use status, is displayed on the screen displayed by the application. Further, according to this embodiment, in a case where the time period of displaying the widget is insufficient because, for example, the execution time of the selected application is short, a widget is displayed in a superimposed manner on the information display which is displayed after the application is executed. Further, in this embodiment, it is assumed that the screen which is displayed after the application is executed is the information screen. Note that, however, the present invention is not limited to thereto. According to this embodiment, the widget is superimposed on a screen which is displayed after the execution of the application.

In the following, the screens, which are displayed on the display operation device 38 of the image processing apparatus 300, are described.

Figure 12:
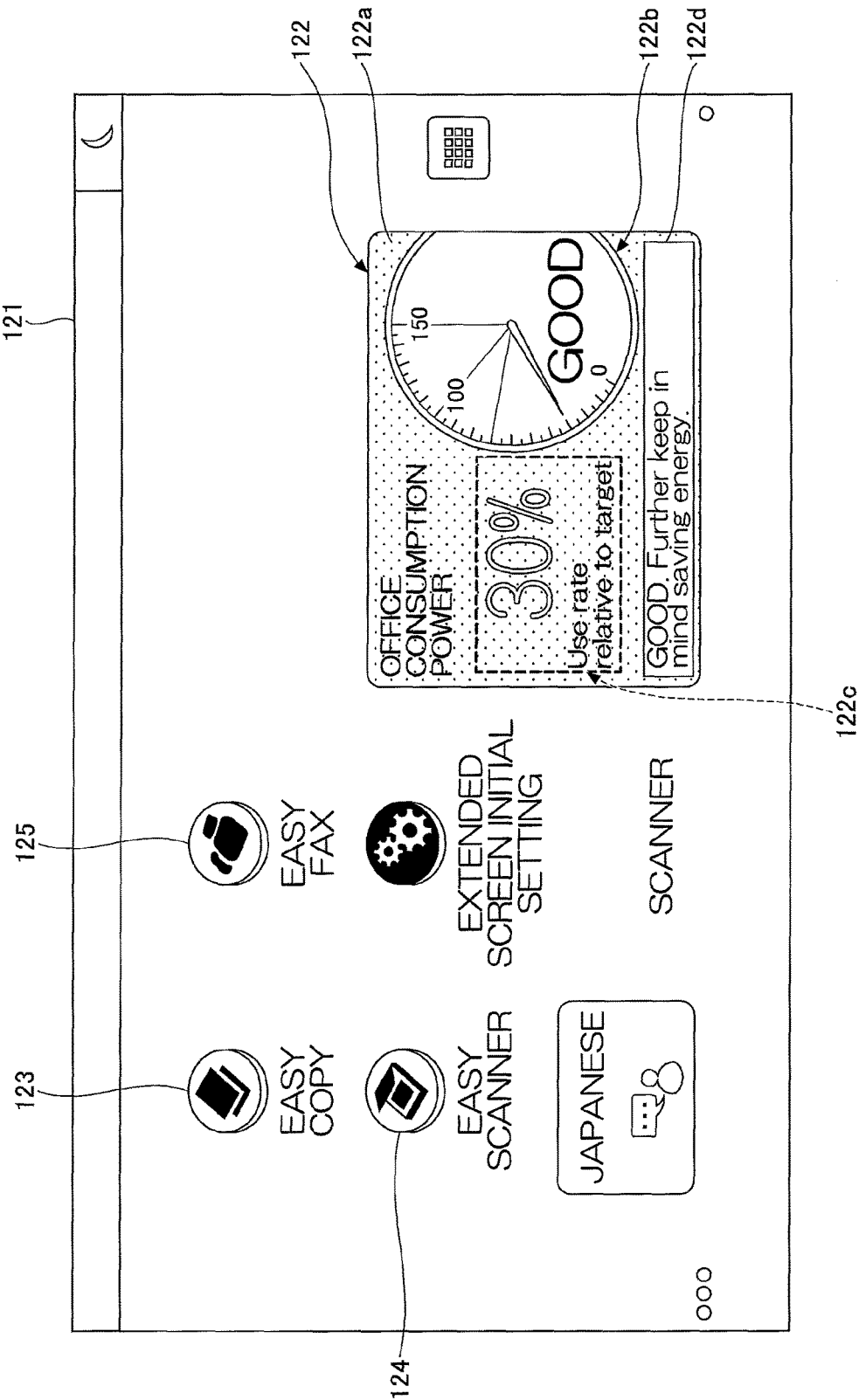
FIG. 12 is a first drawing illustrating an example of a wait screen displayed on the image processing apparatus.

FIG. 12 is a first drawing illustrating one example of a wait screen 121 displayed on the image processing apparatus 300. The wait screen 121 illustrates a case where the use status information, which the image processing apparatus 300 acquires from the power monitoring server 200, is the use status information 212-1 (see FIG. 6). That is, the wait screen 121 of FIG. 12 is the wait screen when the (value (data) of the) "status" is "good".

On the wait screen 121 in this embodiment, a widget 122 of the widget type "A" is displayed in a superimposed manner. Further, on the wait screen 121, the icons 123, 124, and 125 of the application, which is executed by the image processing apparatus 300, are displayed. The icon 123 of the application is used to realize a copy process. The icon 124 of the application is used to realize a scanning process. The icon 125 of the application is used to realize a fax process. In the image processing apparatus 300 according to this embodiment, when, for example, the icon 123 is selected on the wait screen 121, it is assumed that the selection of the application is received.

As described, according to this embodiment, the widget 122 based on the use status information is superimposed on the wait screen 121 on which icons of the applications are displayed. Therefore, according to this embodiment, it becomes possible to cause a user of the image processing apparatus 300 to recognize the use status of power. Especially, according to an embodiment, even when a user is not interested in the use state of power or even when a user is not conscious of reducing consumption power (energy consumption), the use status of power can be shown to the user by using the image processing apparatus 300, so that it becomes possible to promote measures to reduce energy consumption.

The widget 122 includes the part elements which are included in the use status information 212-1. The widget 122 of FIG. 12 includes part elements 122*a*, 122*b*, 122*c*, and 122*d*.

The part element 122*a* corresponds to the image data of "background "A"", and is displayed on the right side of the center of the wait screen 121 based on the "display position" included in the use status information 212-1. The part element 122*b* corresponds to the image data of "status "A"", and is displayed on the right side of the center of the background based on the "display position" included in the use status information 212-1. Further, the part element 122*b* includes the display ("good") which indicates the status, and a meter which indicates the use rate.

The part element 122*c* corresponds to the image data of "use rate "A"", and is displayed in the center on the left side of the center of the background based on the "display position" included in the use status information 212-1.

The part element 122*d* corresponds to the image data of "message "A"", and is displayed on the bottom (lower) side of the background based on the "display position" included in the use status information 212-1. In the widget 122 according to this embodiment, the message may be displayed in a flowing manner.

Figure 13:
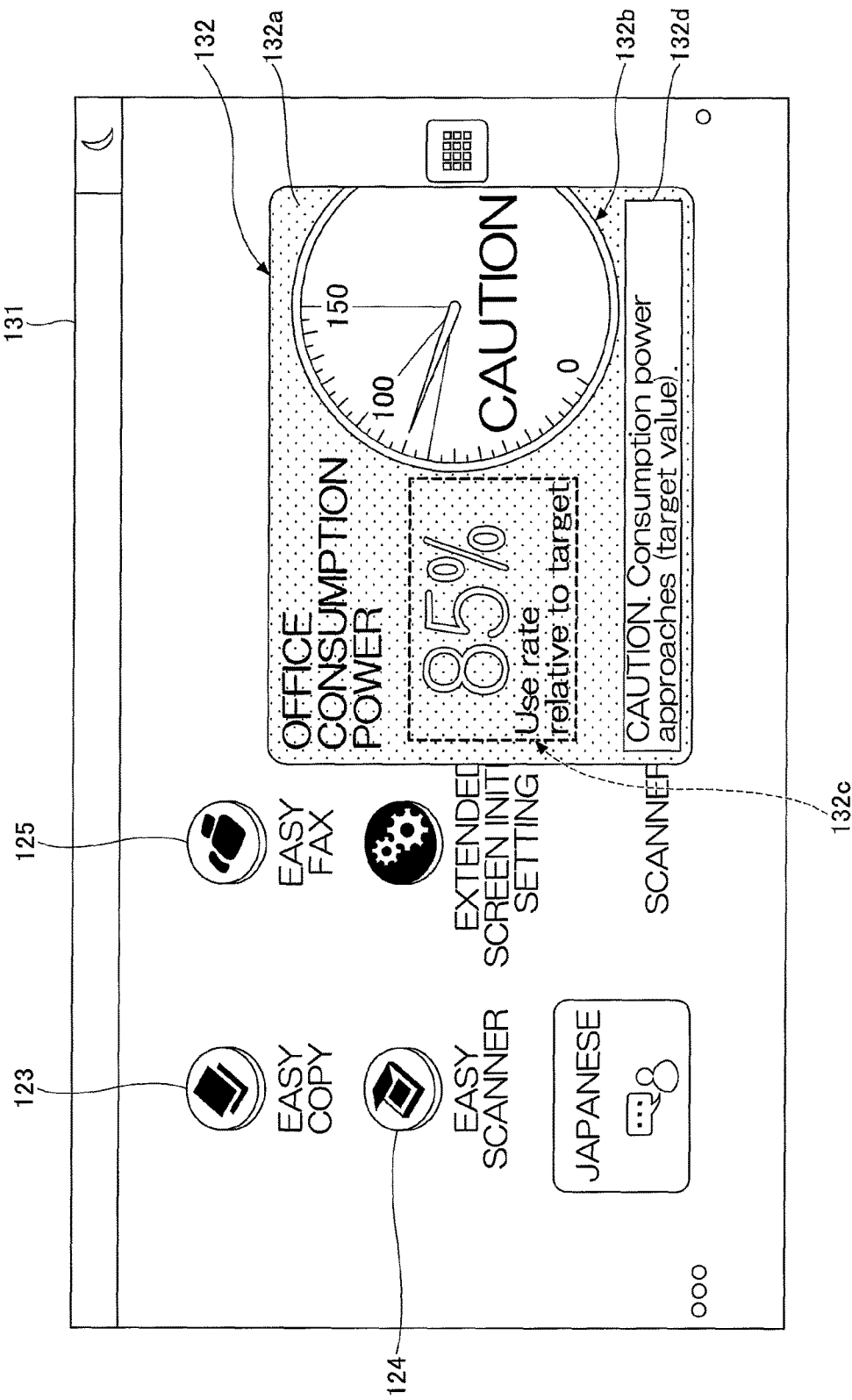
FIG. 13 is a second drawing illustrating an example of the wait screen displayed on the image processing apparatus.

FIG. 13 is a second drawing illustrating one example of a wait screen 131 displayed on the image processing apparatus 300. The wait screen 131 of FIG. 13 illustrates a case where the use status information, which the image processing apparatus 300 acquires from the power monitoring server 200, is the use status information 212-3 (see FIG. 6). That is, the wait screen 131 of FIG. 13 is the wait screen when the "status" is "caution".

On the wait screen 131 of FIG. 13, a widget 132 of the widget type "C" is displayed in a superimposed manner. Further, on the wait screen 131, the icons 123, 124, and 125 of the application, which is executed by the image processing apparatus 300, are displayed. The icons 123, 124, and 125 are similar to those displayed in the wait screen 121 of FIG. 12.

The widget 132 of FIG. 13 includes the part elements 132*a*, 132*b*, 132*c*, and 132*d* which are included in the use status information 212-3.

The part element 132*a* corresponds to the image data of "background "C"", and is displayed on the right side of the center of the wait screen 131 based on the "display position" included in the use status information 212-3 and larger than the part element 122*a*. Further, it is desired that the color of the background displayed as the part element 132*a* in this embodiment be darker (brighter) than the color of the background displayed as the part element 122*a*.

The part element 132*b* corresponds to the image data of "status "C"", and is displayed on the right side of the center of the background based on the "display position" included in the use status information 212-3. The part element 132*c* corresponds to the image data of "use rate "C"", and is displayed in the center on the left side of the center of the background based on the "display position" included in the use status information 212-3. The part element 132*d* corresponds to the image data of "message "C"", and is displayed on the bottom (lower) side of the background based on the "display position" included in the use status information 212-3.

In the widget 132 of FIG. 13, the display size of the part element 132*a* is larger than that of the part element 122*a*. Accordingly, the display sizes of the part elements 132*b*, 132*c*, and 132*d* are larger than those of the part element 122*b*, 122*c*, and 122*d*, respectively. As a result, by using the wait screen 131, it becomes possible to emphasize that saving more power (energy) is requested.

Figure 14:
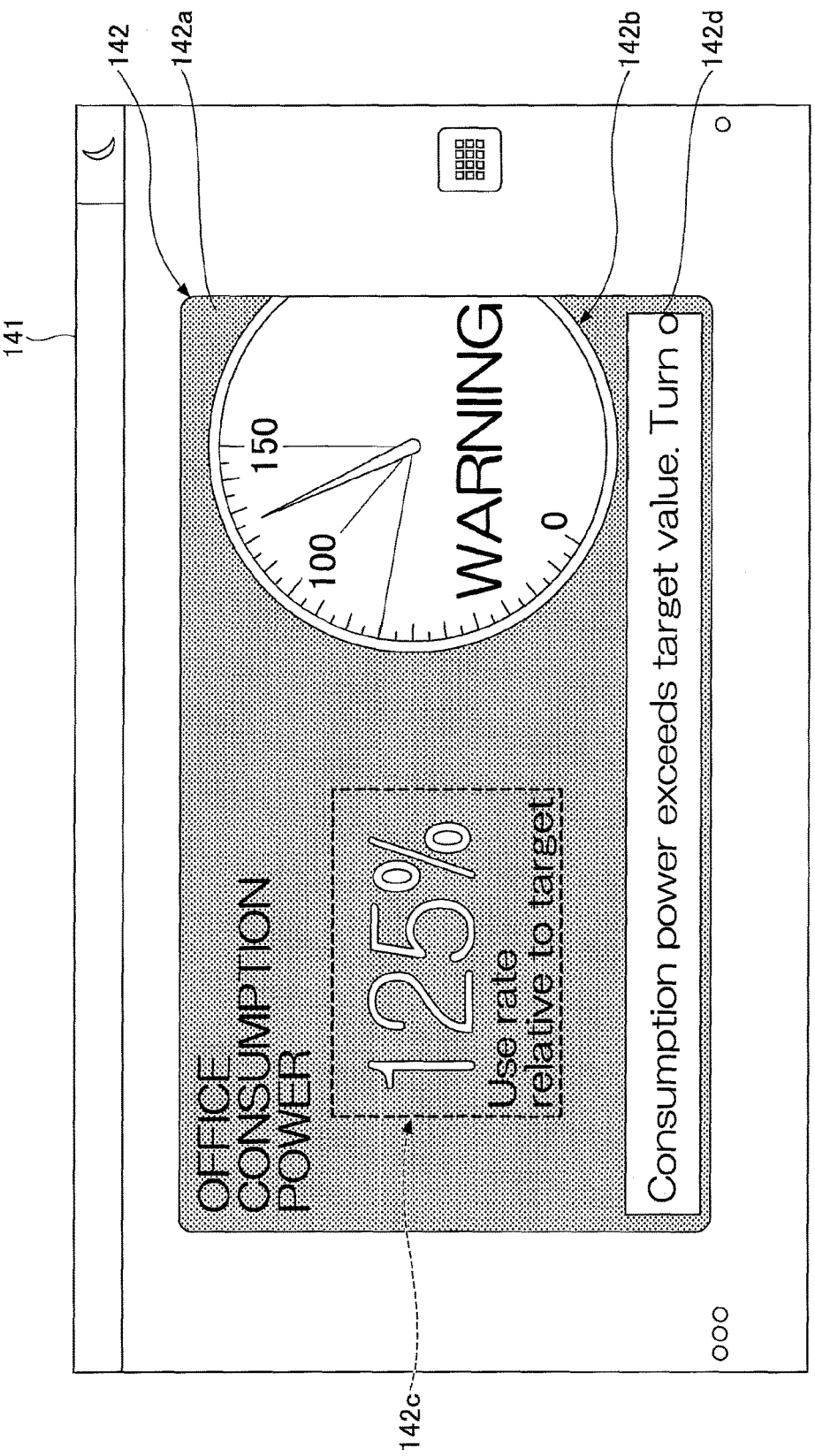
FIG. 14 is a third drawing illustrating an example of the wait screen displayed on the image processing apparatus.

FIG. 14 is a third drawing illustrating one example of a wait screen 141 displayed on the image processing apparatus 300. The wait screen 141 of FIG. 14 illustrates a case where the use status information, which the image processing apparatus 300 acquires from the power monitoring server 200, is the use status information 212-4 (see FIG. 6). That is, the wait screen 141 of FIG. 14 is the wait screen when the "status" is "warning".

The widget 142 of FIG. 14 includes the part elements 142a, 142b, 142c, and 142d which are included in the use status information 212-4.

The part element 142a corresponds to the image data of "background "D"", and is displayed at the center of the wait screen 141 based on the "display position" included in the use status information 212-4 and larger than the part element 132a. The part elements 142b, 142c, and 142d are displayed based on the "display position" included in the use status information 212-4. Further, it is desired that the color of the background displayed as the part element 142a in this embodiment be darker (brighter) than the color of the background displayed as the part element 122a. Further, the color of the background displayed as the part element 142a in this embodiment is darker (brighter) than the color of the background displayed as the part element 132a.

In the widget 142 of FIG. 14, the display size of the part element 142a is larger than that of the part element 132a. Accordingly, the display sizes of the part elements 142b, 142c, and 142d are larger than those of the part element 132b, 132c, and 132d, respectively. As a result, by using the wait screen 141, it becomes possible to (effectively) give a warning that the consumption power total value exceeds the consumption power target value to a user of the image processing apparatus 300.

Further, in the wait screen 141 of FIG. 14, the widget 142 is displayed in a manner such that the widget 142 overwrites the icons 123, 124, and 125 of the applications.

In the image processing apparatus 300 according to this embodiment, for example, after a predetermined time period has passed since the widget 142 is displayed on the wait screen 141, the display size of the widget 142 may be changed into that of the widget 122 or the widget 132. Otherwise, after a predetermined time period has passed since the widget 142 is displayed on the wait screen 141, the display size of the widget 142 may be terminated.

Figure 15:
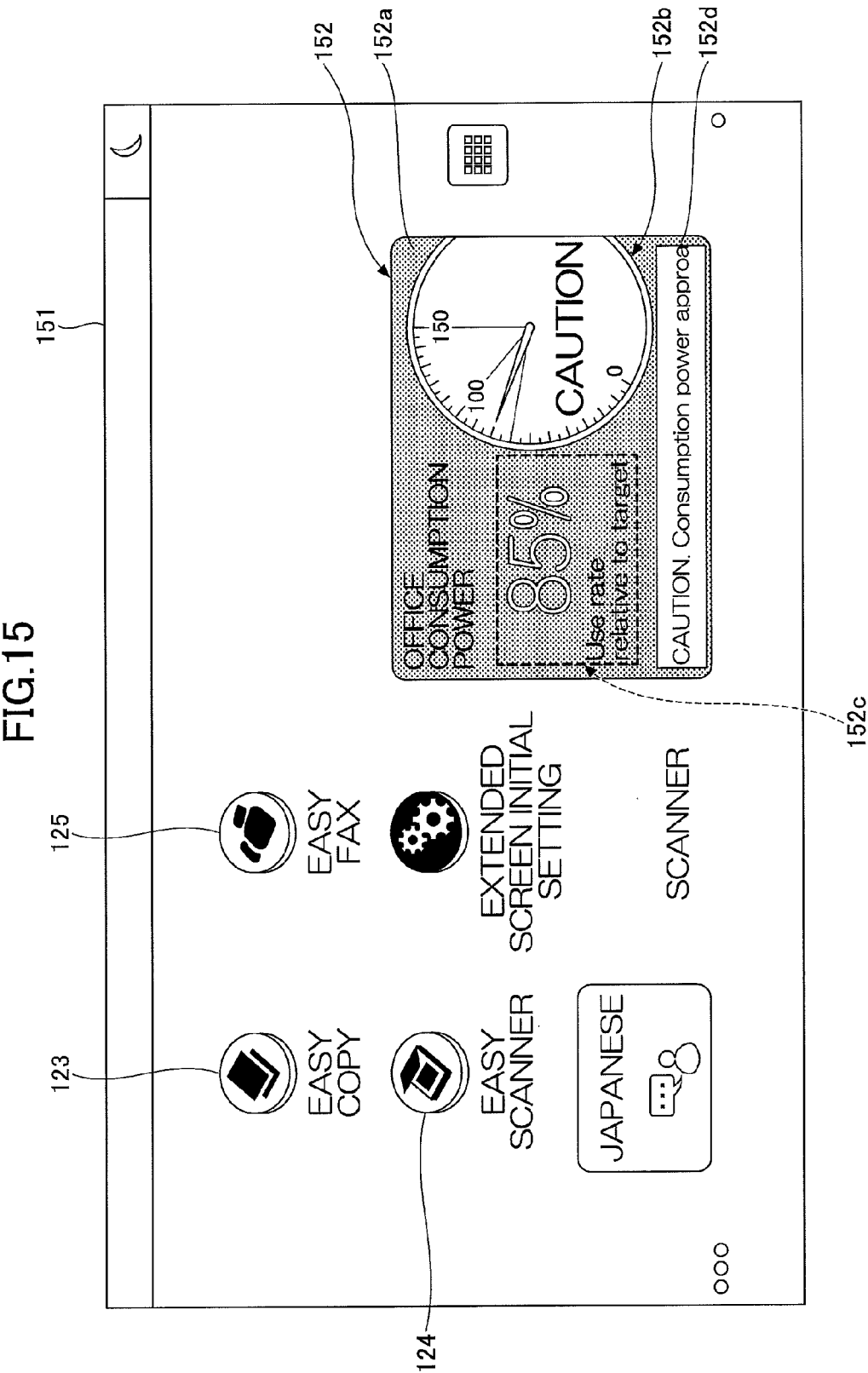
FIG. 15 is a fourth drawing illustrating an example of the wait screen displayed on the image processing apparatus.

FIG. 15 is a fourth drawing illustrating one example of a wait screen 151 displayed on the image processing apparatus 300. The wait screen 151 of FIG. 15 illustrates another case where the use status information, which the image processing apparatus 300 acquires from the power monitoring server 200, is the use status information 212-3 (see FIG. 6).

FIG. 15 illustrates a case where the display sizes of the part elements 152a through 152d included in the widget 152 in the wait screen 151 are similar to those of the part elements 122a through 122d included in the widget 122 displayed in the wait screen 121.

In the example of FIG. 15, the color of the background displayed as the part element 152a is darker (brighter) than that of the background displayed as the part element 122a.

Next, a display of the widget is described in an operation screen of an application after the application is selected in a wait screen. First, a case is descried where the icon 123, which realizes the copy process, in the wait screen is selected.

Figure 16:
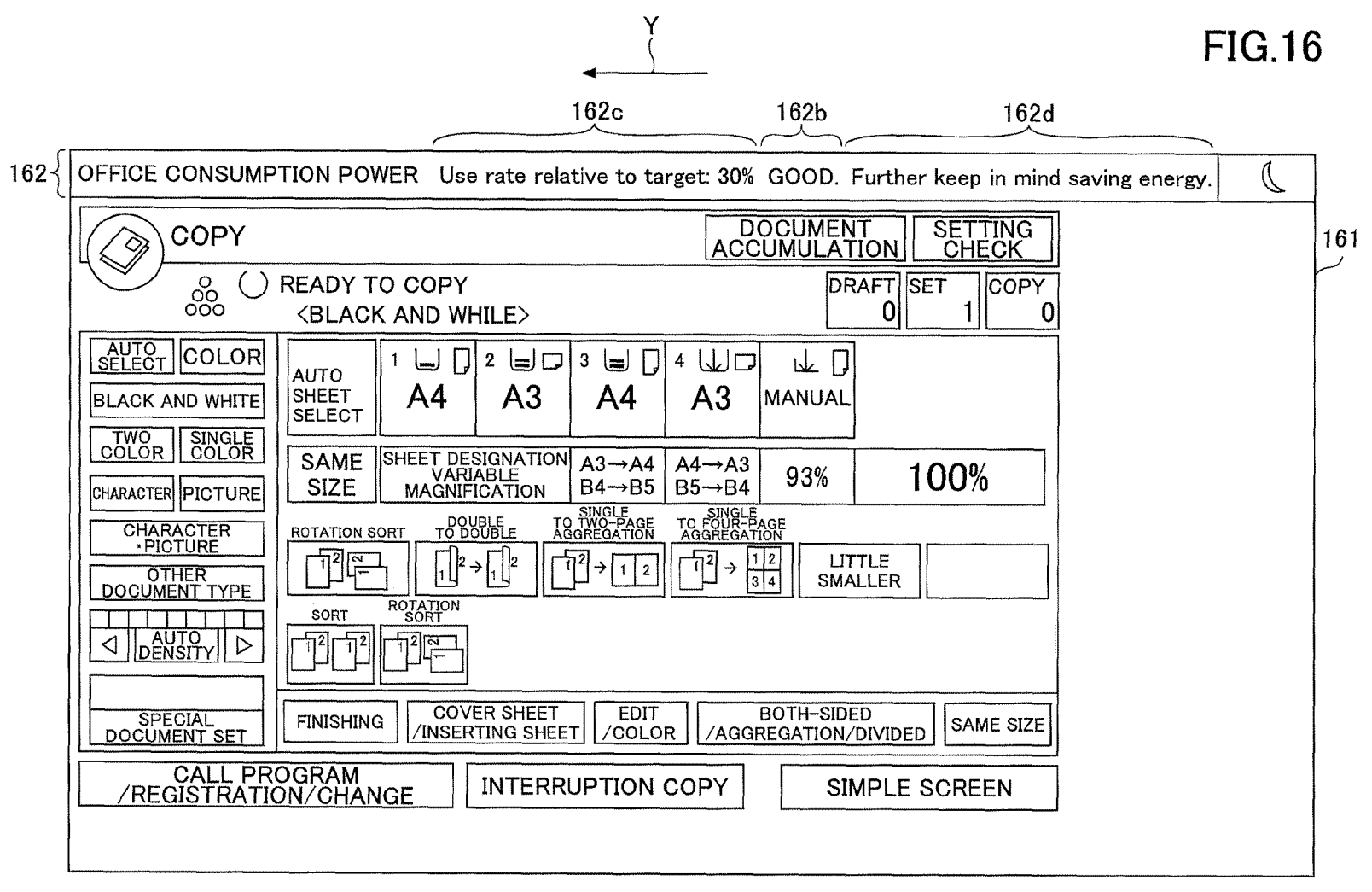

FIG. 16 is a first drawing illustrating one example of an operation screen 161 of the copy process displayed on the image processing apparatus 300.

The operation screen 161 of FIG. 16 is an example of the operation screen in a case where the icon 123 is selected in the wait screen 121 of FIG. 12. That is, the operation screen 161 is an operation screen in which the "status" included in the use status information 212-1 is "good".

In this embodiment, after the icon 123 in the wait screen is selected and various settings of the copy process are received in the operation screen 161 and when the start key is operated, the display of the widget 162 is started. The various settings of the copy process include, for example, the settings of No. of sheets to be printed, aggregate printing, double-sided printing, one-sided printing, etc.

When the start key is operated, the image processing apparatus 300 reports the type of the selected application to the power monitoring server 200. In response to the report, the power monitoring server 200 selects and transmits the display control table 221-c, which corresponds to the copy process, to the image processing apparatus 300.

The image processing apparatus 300 extracts the display control information, in which the value of the item "status" is "good", from the display control table 221-c, and displays the widget 162 in accordance with the extracted display control information (see FIG. 7).

Here, the extracted display control information refers to the display control information of the display pattern "1". Accordingly, the widget 162 of FIG. 16 is displayed based on the display control information of the display pattern "1".

According to the display control information of the display pattern "1", the part elements of the widget 162 are "status A1", "message A1" and "use rate A1", and the display positions thereof are upper side of the operation screen 161. The "display manner" of the widget 162 is "scroll".

Therefore, in the operation screen 161 of the image processing apparatus 300, the part element 162b indicating the status, the part element 162c indicating the use rate, and the part element 162d displaying the message are displayed on the upper side (part) of the operation screen 161 in a manner such that those part elements scroll in the arrow Y direction in accordance with the "display manner".

According to this embodiment, as described above, after the start key is operated, the widget 162 is displayed on the operation screen 161. By doing this, it becomes possible to give notice of the use status of power to a user before the copy process ends so that the user can recognize the use status of power.

Figure 17:
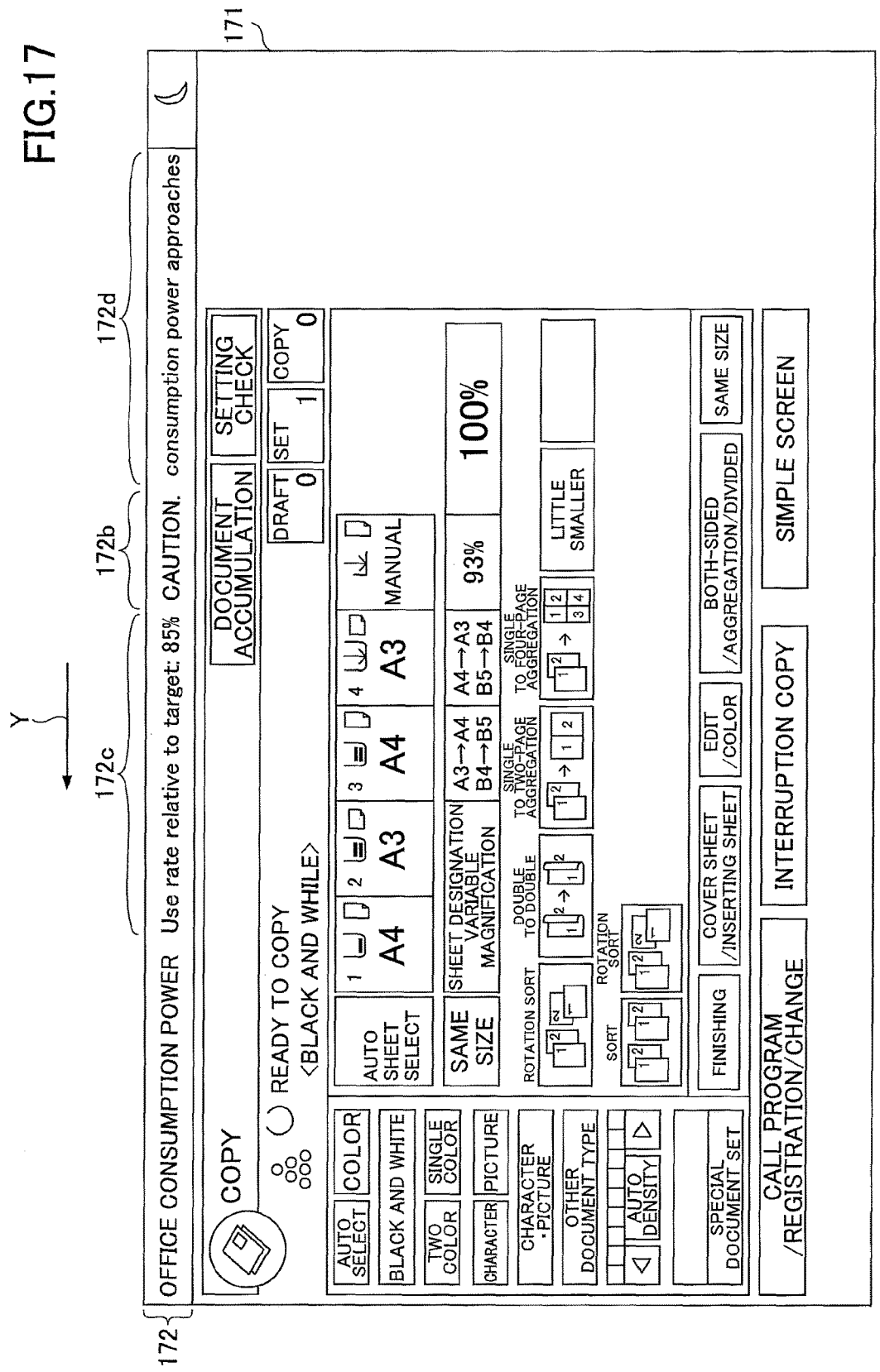
FIG. 17 is a second drawing illustrating an example of the operation screen of the copy process displayed on the image processing apparatus.

FIG. 17 is a second drawing illustrating one example of an operation screen 171 of the copy process displayed on the image processing apparatus 300.

The operation screen 171 of FIG. 17 is an example of the operation screen in a case where the icon 123 is selected in the wait screen 131 of FIG. 13. That is, the operation screen 171 is an operation screen in which the "status" included in the use status information 212-3 is "caution".

The image processing apparatus 300 extracts the display control information, in which the value of the item "status" is "caution", from the display control table 221-c, and displays the widget 172 in accordance with the extracted display control information (see FIG. 7).

Here, the extracted display control information refers to the display control information of the display pattern "3". Accordingly, the widget 172 of FIG. 17 is displayed based on the display control information of the display pattern "3".

According to the display control information of the display pattern "3", the part elements of the widget 172 are "status C1", "message C1" and "use rate C1", and the display positions thereof are upper side of the operation screen 171. The "display manner" of the widget 172 is "scroll with blinking".

Therefore, in the operation screen 171 of the image processing apparatus 300, the part element 172b indicating the status, the part element 172c indicating the use rate, and the part element 172d displaying the message are displayed on the upper side (part) of the operation screen 171 in a manner such that those part elements scroll in the arrow Y direction with blinking in accordance with the "display manner".

Similar to the widget 162, the widget 172 of FIG. 17 is displayed in the operation screen 171 before the copy process ends.

Figure 18:
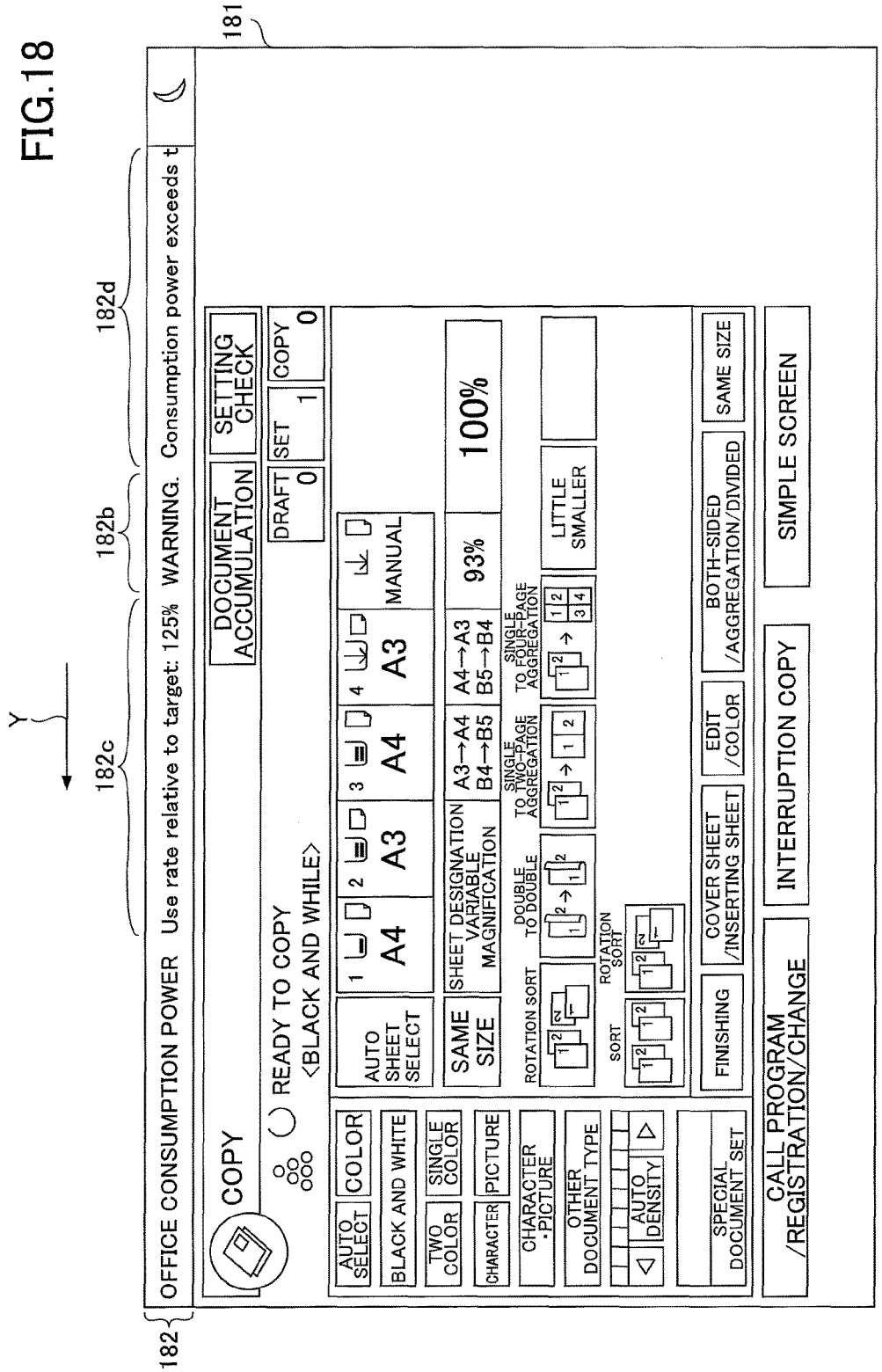
FIG. 18 is a third drawing illustrating an example of the operation screen of the copy process displayed on the image processing apparatus.

FIG. 18 is a third drawing illustrating one example of an operation screen 181 of the copy process displayed on the image processing apparatus 300.

The operation screen 181 of FIG. 18 is an example of the operation screen in a case where the icon 123 is selected in the wait screen 141 of FIG. 14. That is, the operation screen 181 is an operation screen in which the "status" included in the use status information 212-4 is "warning".

The image processing apparatus 300 extracts the display control information, in which the value of the item "status" is "warning", from the display control table 221-c, and displays the widget 182 in accordance with the extracted display control information (see FIG. 7).

Here, the extracted display control information refers to the display control information of the display pattern "4". Accordingly, the widget 182 of FIG. 18 is displayed based on the display control information of the display pattern "4".

According to the display control information of the display pattern "4", the "display manner" of the widget 182 includes two types. One is "scroll with blinking", which is similar to that of the widget 172, and the other is "pop up during copying".

FIG. 18 illustrates a case where the widget 182 is displayed in the first display manner of "scroll with blinking". That is, in the operation screen 181 of the image processing apparatus 300, a part element 182b indicating the status, a part element 182c indicating the use rate, and a part element 182d displaying the message are displayed on the upper side (part) of the operation screen 181 in a manner such that those part elements scroll in the arrow Y direction with blinking in accordance with the "display manner".

FIG. 19 is a fourth drawing illustrating one example of an operation screen 181 of the copy process displayed on the image processing apparatus 300. FIG. 19 illustrates a case where a widget 182A is displayed on the upper side (part) of the operation screen 181 in the second display manner of "pop up during copying".

In FIG. 19, the widget 182A includes the part elements 182b through 182d which are similar to those in the widget 182.

In this embodiment, as illustrated in FIG. 19, in a case where the "status" included in the use status information is "warning", during copying, the widget 182A is pop up and takes up (substantially) the entire screen. In this embodiment, by displaying the widget 182A by popping up on the entire screen, it becomes possible to cause a user of the image processing apparatus 300 to easily recognize the use status of power while waiting for ending of the copy process.

Further, the term "pop up" herein refers to opening of a new window to display the widget 182A which is different from the operation screen 181.

As described above, according to this embodiment, during process execution of an application, a widget is displayed based on the display control information corresponding to the application. By doing this, it becomes possible to cause a user of the image processing apparatus 300 to recognize the use status of power during process execution of the application.

Next, a case is described where the icon 124, which realizes a scanning process is selected in the wait screen.

FIG. 20 is a first drawing illustrating one example of an operation screen 201 of the scanning process displayed on the image processing apparatus 300.

The operation screen 201 of FIG. 20 is an example of the operation screen in a case where the icon 124 is selected in the wait screen 121 of FIG. 12. That is, the operation screen 201 is an operation screen in which the "status" included in the use status information 212-1 is "good".

When the start key is operated, the image processing apparatus 300 reports the type of the selected application to the power monitoring server 200. In response to the report, the power monitoring server 200 selects and transmits the display control table 221-s, which corresponds to the scanning process, to the image processing apparatus 300.

The image processing apparatus 300 extracts the display control information, in which the value of the item "status" is "good", from the display control table 221-s, and displays the widget 202 in accordance with the extracted display control information (see FIG. 8).

Here, the extracted display control information refers to the display control information of the display pattern "1". Accordingly, the widget 202 of FIG. 20 is displayed based on the display control information of the display pattern "1".

According to the display control information of the display pattern "1", the part elements of the widget 162 are "status A2", "message A2" and "use rate A2", and the display positions thereof are upper side of the operation screen 201. The "display manner" of the widget 162 is "scroll".

Therefore, in the operation screen 201 of the image processing apparatus 300, the part element 202b indicating the status, the part element 202c indicating the use rate, and the part element 202d displaying the message are displayed on the upper side (part) of the operation screen 201 in a manner such that those part elements scroll in the arrow Y direction in accordance with the "display manner".

Figure 21:
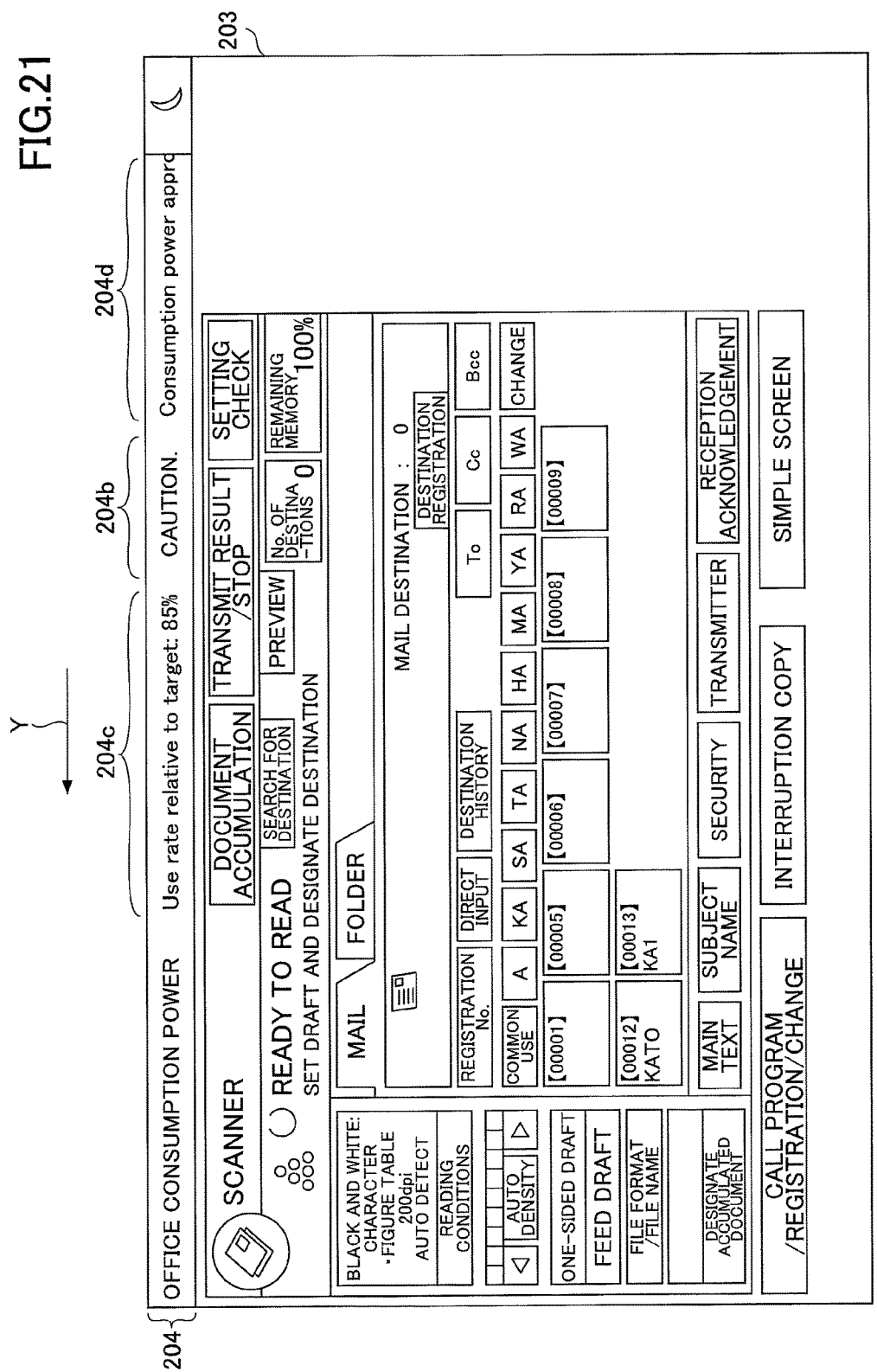
FIG. 21 is a second drawing illustrating an example of the operation screen of the scanning process displayed on the image processing apparatus.

FIG. 21 is a second drawing illustrating one example of an operation screen 203 of the scanning process displayed on the image processing apparatus 300.

The operation screen 203 of FIG. 21 is an example of the operation screen in a case where the icon 124 is selected in the wait screen 131 of FIG. 13. That is, the operation screen 203 is an operation screen in which the "status" included in the use status information 212-3 is "caution".

The image processing apparatus 300 extracts the display control information, in which the value of the item "status" is "caution", from the display control table 221-s, and displays the widget 204 in accordance with the extracted display control information (see FIG. 8).

Here, the extracted display control information refers to the display control information of the display pattern "3". Accordingly, the widget 204 of FIG. 21 is displayed based on the display control information of the display pattern "3".

According to the display control information of the display pattern "3", the part elements of the widget 204 are "status C2", "message C2" and "use rate C2", and the display positions thereof are upper side of the operation screen 203. The "display manner" of the widget 172 is "scroll with blinking".

Therefore, in the operation screen 203 of the image processing apparatus 300, the part element 204b indicating the status, the part element 204c indicating the use rate, and the part element 204d displaying the message are displayed on the upper side (part) of the operation screen 203 in a manner such that those part elements scroll in the arrow Y direction with blinking in accordance with the "display manner".

Figure 22:
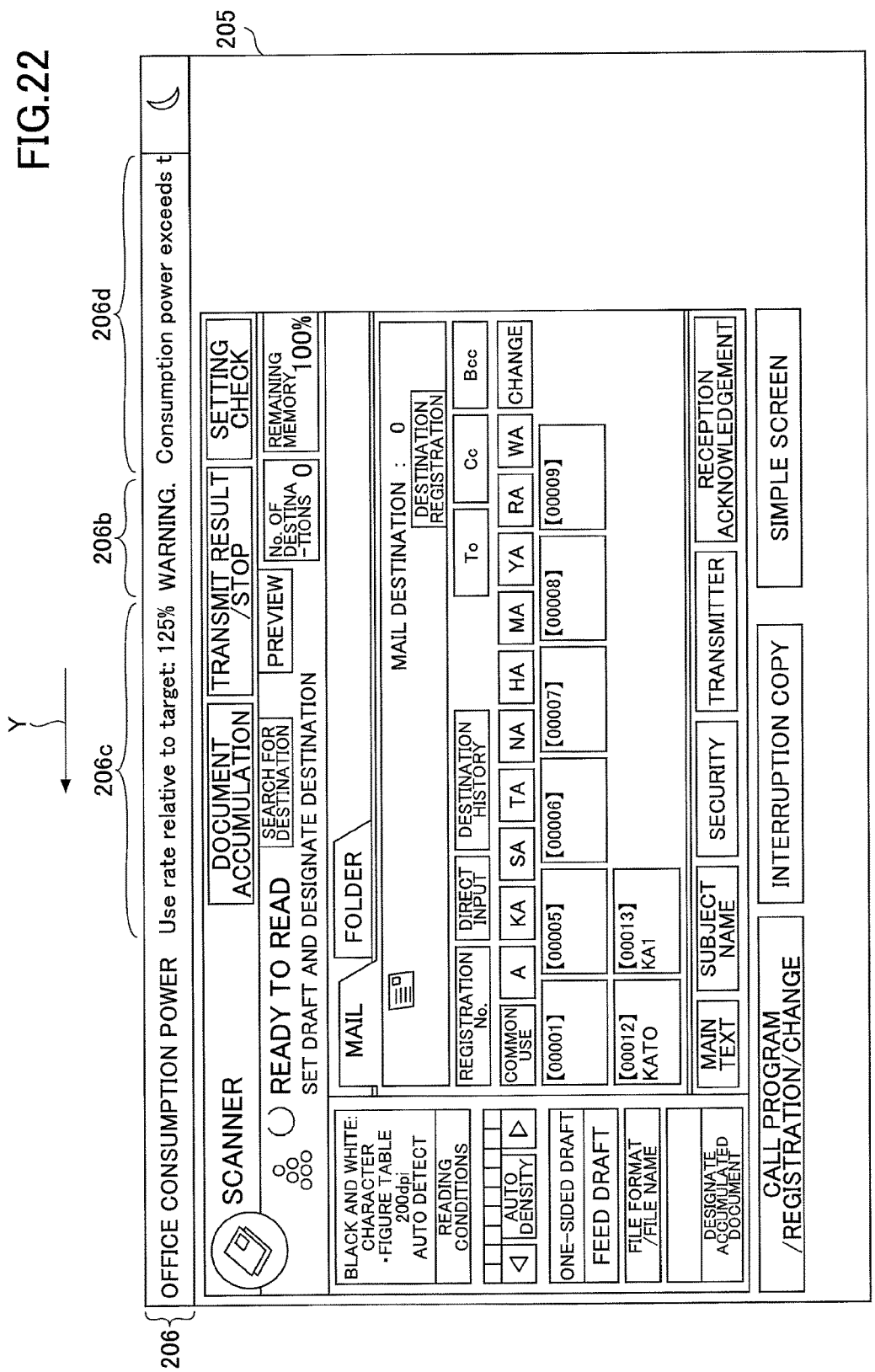
FIG. 22 is a third drawing illustrating an example of the operation screen of the scanning process displayed on the image processing apparatus.

FIG. 22 is a third drawing illustrating one example of an operation screen 205 of the copy process displayed on the image processing apparatus 300.

The operation screen 205 of FIG. 22 is an example of the operation screen in a case where the icon 124 is selected in the wait screen 141 of FIG. 14. That is, the operation screen 205 is an operation screen in which the "status" included in the use status information 212-4 is "warning".

The image processing apparatus 300 extracts the display control information, in which the value of the item "status" is "warning", from the display control table 221-s, and displays the widget 206 in accordance with the extracted display control information (see FIG. 8).

According to the display control information of the display pattern "4", the "display manner" of the widget 206 includes two types. One is "scroll with blinking", which is similar to that of the widget 204, and the other is "pop up during copying".

FIG. 22 illustrates a case where the widget 206 is displayed in the first display manner of "scroll with blinking". That is, in the operation screen 205 of the image processing apparatus 300, a part element 206b indicating the status, a part element 206c indicating the use rate, and a part element 206d displaying the message are displayed on the upper side (part) of the operation screen 205 in a manner such that those part elements scroll in the arrow Y direction with blinking in accordance with the "display manner".

Figure 23:
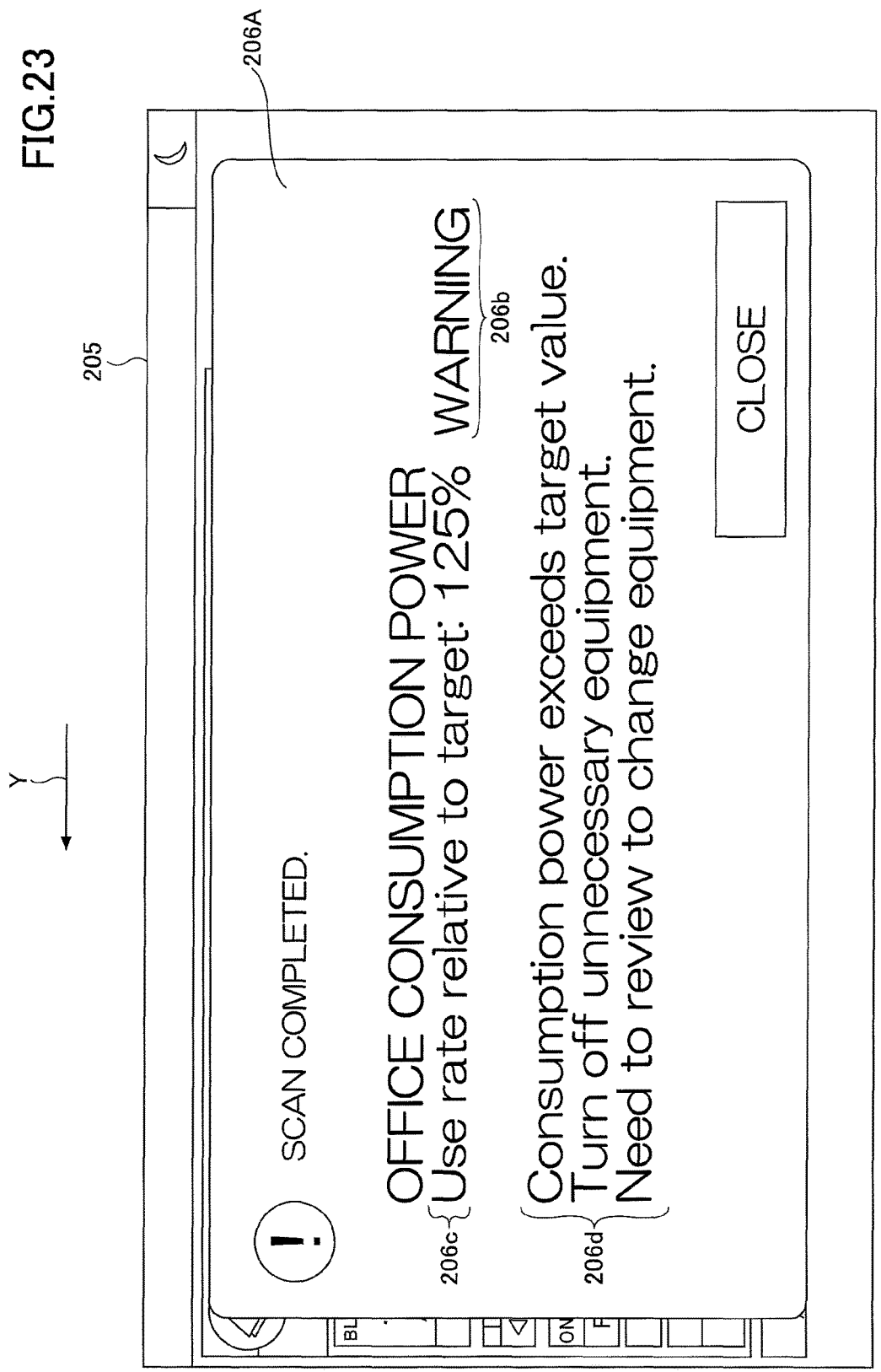
FIG. 23 is a fourth drawing illustrating an example of the operation screen of the scanning process displayed on the image processing apparatus.

FIG. 23 is a fourth drawing illustrating one example of an operation screen 181 of the copy process displayed on the image processing apparatus 300. FIG. 23 illustrates a case where a widget 206A is displayed on the upper side (part) of the operation screen 205 in the second display manner of "pop up after scanning".

In FIG. 23, the widget 2062A includes the part elements 206b through 206d which are similar to those in the widget 206.

As described, according to this embodiment, in a case where the "status" included in the use status information is "warning", after the scanning process is completed, the widget 206A is pop up and takes up (substantially) the entire screen. In this embodiment, by displaying the widget 206A by popping up on the entire screen, it becomes possible to cause a user of the image processing apparatus 300 to easily recognize the use status of power while waiting for ending of the copy process.

Further, according to this embodiment, for example, in a case where the scanning process completes within a predetermined time period due to small number of sheets to be read by the scanning, a widget, which is based on the use status information, may be displayed on the information screen after the scanning process completes. Further, in this case, the widget may be popped up covering the entire information screen similar to the widget 206A of FIG. 23.

Further, according to this embodiment, for example, in a case where the execution time of the process of the application selected in the wait screen ends within a predetermine time period, the widget, which is based on the use status information, may be displayed when a user of the image processing apparatus 300 logs out.

As described above, according to this embodiment, the widget, which corresponds to the ratio of the consumption power total value that is totaled by the power monitoring server 200, to the consumption power target value, is displayed on the display operation device 38 of the image processing apparatus 300. Therefore, according to this embodiment, it becomes possible to cause a user to recognize the use status of power.

Further, according to this embodiment, the ratio of the consumption power total value to the consumption power target value is indicated as the status that indicates the use status of power, and the widget, which corresponds to the status, is displayed in the display area whenever the image processing apparatus 300 is operated. For example, in a case where the operation of the image processing apparatus 300 is in a wait status, the widget, which corresponds to the status, is displayed on the wait screen. Further, for example, in a case where the operation of the image processing apparatus 300 is in the copy process, the widget, which corresponds to the status, is displayed on the operation screen of the copy process.

Therefore, according to this embodiment, it becomes possible to show the use status of consumption power to a user of the image processing apparatus 300 regardless of whether the user is conscious of reducing energy consumption, so that it becomes possible to promote measures to reduce energy consumption.

Second Embodiment

In the following, a second embodiment is described with reference to the drawings. The second embodiment differs from the first embodiment in the timing when the image processing apparatus 300 acquires the use status information from the power monitoring server 200. Therefore, in the following description of the second embodiment, the parts which differ from those in the first embodiment are described. Further, in the description of the second embodiment, the same reference numerals are used to describe the elements similar to those in the first embodiment and the repeated descriptions thereof may be omitted.

Figure 24:
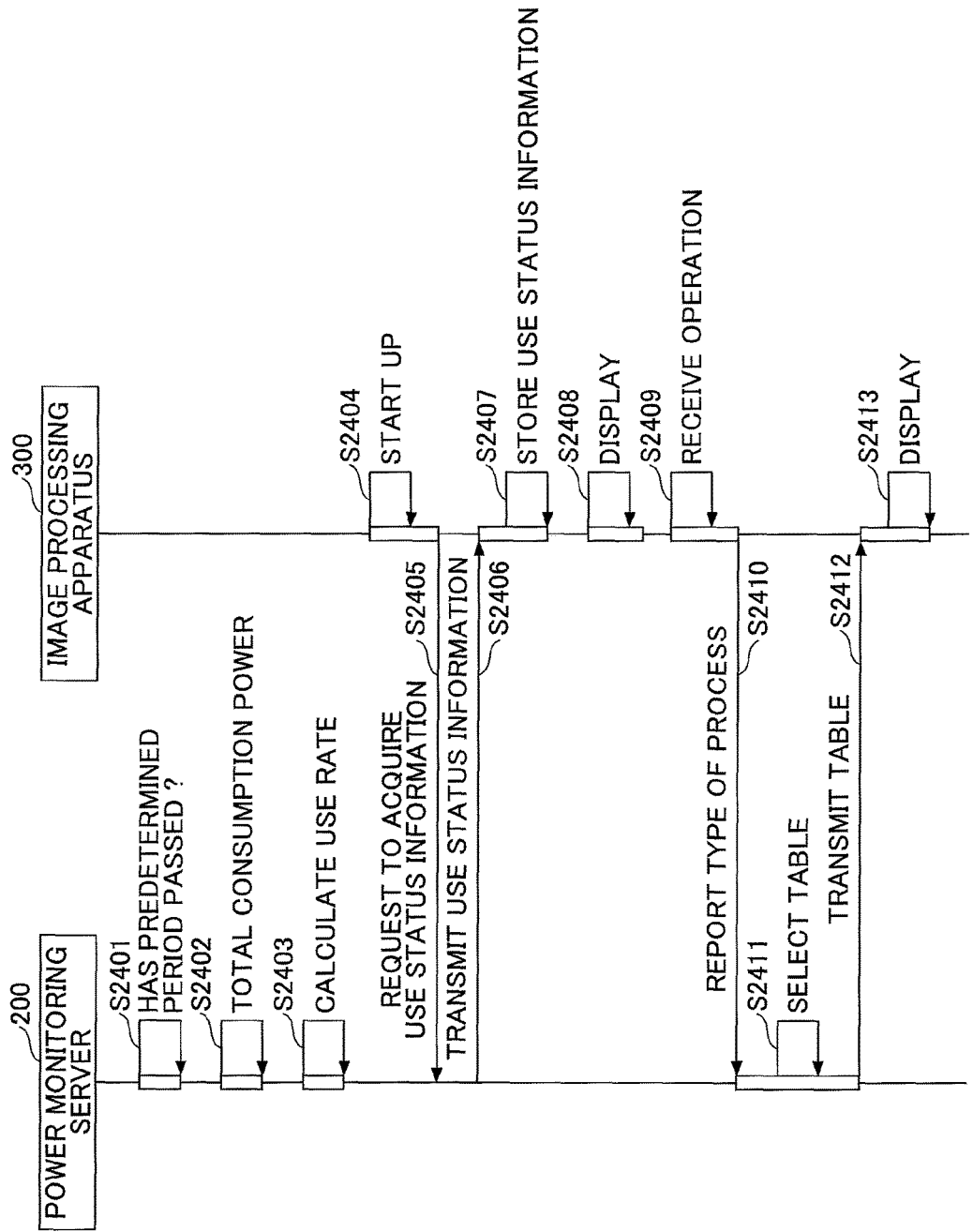
FIG. 24 is a sequence diagram illustrating operations of the power display system according to a second embodiment.

FIG. 24 is a sequence diagram illustrating the operations of the power display system 100 according to the second embodiment.

In this embodiment, it is when the image processing apparatus 300 is started up that the image processing apparatus 300 sends an acquisition request to acquire the use status information 212-n to the power monitoring server 200. The power monitoring server 200 transmits the use status information 212-n when the acquisition request is received to the image processing apparatus 300.

In FIG. 24, the processes in steps S2401 through S2403 are similar to those in steps S1001 through S1003. Therefore, the descriptions thereof are omitted.

In the power display system 100, when the image processing apparatus 300 receives start-up instructions via the input receiving section 321 (step S2404), the communication section 330 sends the acquisition request to acquire the use status information to the power monitoring server 200 (step S2405).

In response to receiving of the acquisition request, the power monitoring server 200 refers to the apparatus management table 211 and the use status table 212, and transmits the use status information 212-n, which indicates the use status of power in the time zone when the acquisition request is received, to the image processing apparatus 300 (step S2406). The use status information 212-n is received by the communication section 330 of the image processing apparatus 300, and is stored in the storage area 340 (step S2407).

In FIG. 24, the processes in steps S2407 through S2413 are similar to those in steps S1006 through S1012. Therefore, the descriptions thereof are omitted.

Figure 25:
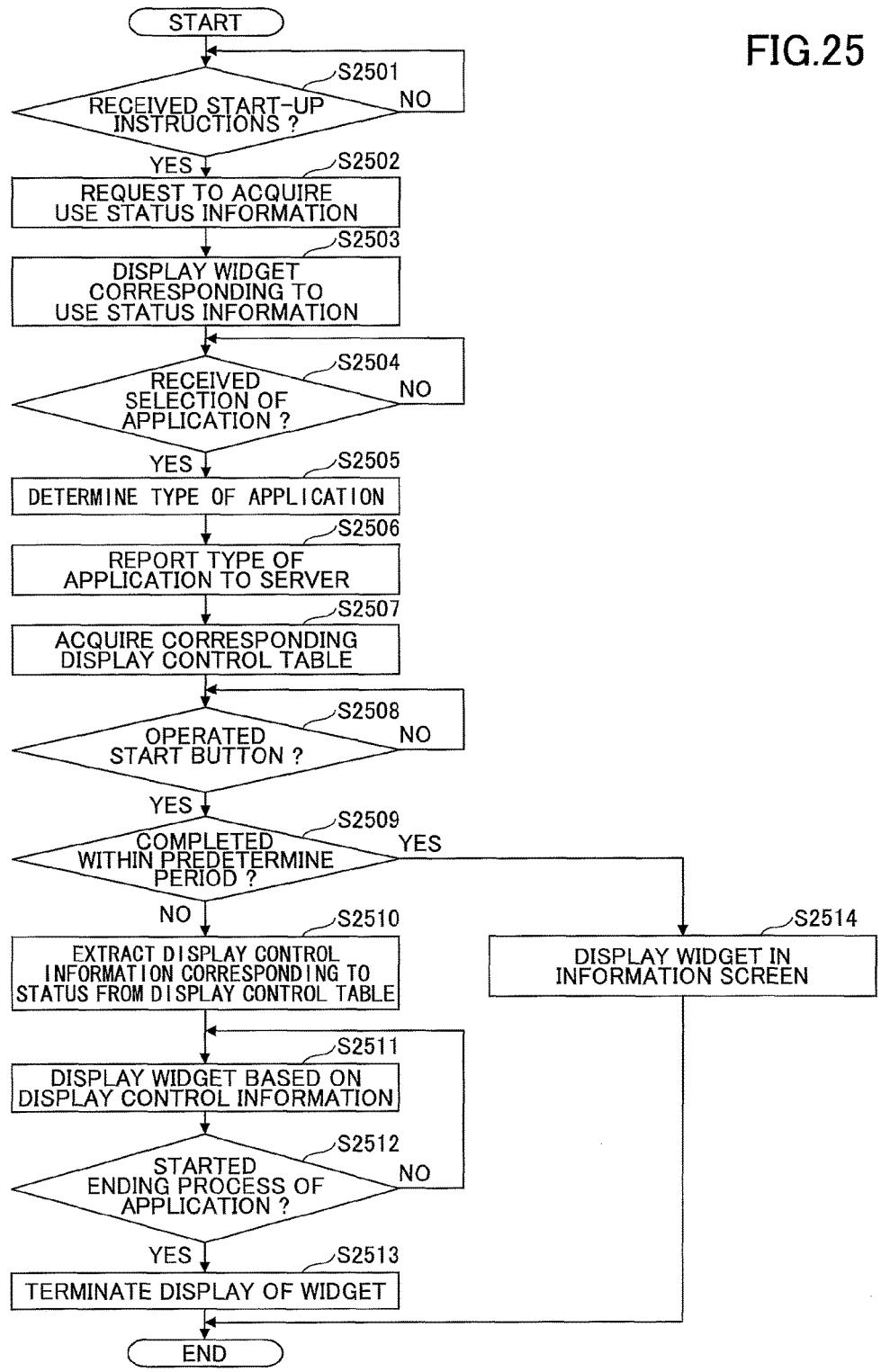
FIG. 25 is a flowchart illustrating operations of the image processing apparatus according to a second embodiment.

FIG. 25 is a flowchart of the operations of the image processing apparatus 300 according to the second embodiment.

The input receiving section 321 of the image processing apparatus 300 according to this embodiment determines whether the start-up instructions are received (step S2501). In step S2501, when it is determined that the start-up instructions are not received, the image processing apparatus 300 waits until the start-up instructions are received.

In step S2501, when it is determined that the start-up instructions are received, the use status information acquisition section 322 of the image processing apparatus 300 sends the acquisition request to acquire the use status information 212-n to the power monitoring server 200 (step S2502). Then, the image processing apparatus 300 displays the widget, which is based on the use status information 212-n acquired from the power monitoring server 200, in a superimposed manner on the wait screen (step S2503). Then, the input receiving section 321 of the image processing apparatus 300 determines whether a selection of an application is received (step S2504).

In FIG. 25, the processes in steps S2504 through S2514 are similar to those in steps S1103 through S1113 of FIG. 11 except a case where the ending process of the application is not started in step S2512. Therefore, the repeated descriptions thereof are herein omitted.

In step S2512, when the ending process of the selected application is not started, the process of the image processing apparatus 300 goes back to step S2511 so that the widget display continues.

As described above, according to this embodiment, the use status information may be acquired from the power monitoring server 200 based on the timing when the image processing apparatus 300 is started up.

MODIFIED EXAMPLE

In the following, with reference to FIGS. 26A through 28, modified examples of the first and second embodiments are described. In the modified embodiments described below, the electronic apparatus group 30 includes a projector, an electronic whiteboard, a communication terminal which is used in a video conference, so that the widget is displayed on those devices.

FIGS. 26A and 26B illustrate a display example in a case where an electronic apparatus is a projector. FIG. 26A illustrates a case where the "status" in the use status information is "good". As illustrated in FIG. 26A, the widget 411 is displayed on the right bottom (lower) side of the center of the projection area 410 by the projector 400. FIG. 26B illustrates a case where the "status" in the use status information is "warning". As illustrated in FIG. 26B, the widget 412 is displayed large at the center of the projection area 410 by the projector 400.

In the examples of FIGS. 26A and 26B, when the power monitoring server 200 receives the acquisition request of the use status information from the projector 400, the power monitoring server 200 refers to the use status table, which corresponds to the projector 400, in the apparatus management database 210, and extracts the use status information which corresponds to the projector 400. Then, the power monitoring server 200 transmits the extracted use status information to the projector 400.

The projector 400 displays the widget as illustrated in FIG. 26A or 26B based on the received use status information. The use status information includes the status which indicates the use status of power. Therefore, according to the examples of FIGS. 26A and 26B, by displaying the widget 412 by the projector 400, it becomes possible to cause a user of the projector 400 to recognize the use status of power.

Further, for example the projector 400 may display the widget for a certain period of time on the projection surface when an operation signal relative to the projector 400 is input thereto.

Further, when, for example, the projector 400 receives instructions to play a slide show, the projector 400 may display the widget in a superimposed manner. Further, when, for example, the projector 400 receives stop instructions to stop the slide show, the projector 400 may display the widget.

That is, the projector 400 may display the widget when the received instructions (signals) are changed from one to another. Further, the projector 400 may display the widget for several seconds, and then terminate the display of the widget. Further, the projector 400 may display the widget when, for example, power is turned on and the input of the image data to be displayed (projected) is not received yet.

FIGS. 27A and 27B illustrate a case where the electronic apparatus is an electronic whiteboard. FIG. 27A illustrates a case where the "status" in the use status information is "good". As illustrated in FIG. 27A, the widget 511 is displayed on the right bottom (lower) side of the center of the display area 510 of the electronic whiteboard 500. FIG. 27B illustrates a case where the "status" in the use status information is "warning". As illustrated in FIG. 27B, the widget 513 is displayed large at the center of the display area 510 of the electronic whiteboard 500.

The electronic whiteboard 500 of FIGS. 27A and 27B includes an operation section 512 which receives operations related to the display on the electronic whiteboard 500, so that various processes can be executed based on the operations on the operation section 512.

The power monitoring server 200 refers to the use status information which corresponds to the electronic whiteboard 500, extracts the use status information corresponding to the electronic whiteboard 500, and transmits the extracted use status information to the electronic whiteboard 500. Further, the power monitoring server 200 selects the display control table, which corresponds to the process that is selected on the operation section 512 of the electronic whiteboard 500, in the display management database 220, and transmits the selected display control table to the electronic whiteboard 500.

The electronic whiteboard 500 displays the widget, which corresponds to the status, based on the status, included in the use status information, and the display control table. Therefore, in the examples of FIGS. 27A and 27B, it becomes possible to cause a user of the electronic whiteboard 500 to recognize the use status of power.

FIG. 28 illustrates a display example in a case where the electronic apparatus is a communication terminal used in a video conference system.

The communication terminal 600 of FIG. 28 has an imaging function, and is one of the communication terminals included in the video conference system. The communication terminal 600 transmits the captured image data to the other communication terminals via a network. The other communication terminals are installed in the locations other than the location where the communication terminal 600 is installed.

Further, the communication terminal 600 displays the image data, which are received from the other communication terminals, and the image data, which are captured by the communication terminal 600, on the display device 610. Therefore, the display device 610 displays each of the image data of the communication terminals included in the video conference system.

In the example of FIG. 28, the location where the communication terminal 600 is installed is called a "location "A"", and the image data which are captured by the communication terminal 600 is displayed in the area 611 of the communication terminal 600. Further, in the example of FIG. 28, the image data, which are captured by the communication terminal installed in location "B", is displayed in the area 613 of the communication terminal 600; the image data, which are captured by the communication terminal installed in location "C", is displayed in the area 615 of the communication terminal 600; and the image data, which are captured by the communication terminal installed in location "D", is displayed in the area 617 of the communication terminal 600.

Here, the communication terminal 600 acquires the use status information, which corresponds to the communication terminal 600, from the power monitoring server 200, and display the widget in accordance with the use status information in a superimposed manner on the image data. In FIG. 28, the widget 612 is displayed in the area 611 where the image data of the communication terminal 600 are displayed. Further, in the example of FIG. 28, when the image data of the communication terminal 600 are not displayed in the area 611, only the widget 612 may be displayed. For example, when power of the communication terminal is turned on, the widget 612 based on the use status information may be displayed in the area 611, and after the imaging function is activated, the widget 612 may be displayed in a superimposed manner on the image data displayed in the area 611. In this case, the communication terminal 600 transmits the image data, in which the widget is superimposed on the captured image data, to the communication terminals installed in the locations "B", "C", and "D".

In the example of FIG. 28, it is assumed that the communication terminals installed in the locations "B", "C", and "D" have the function to display the widget in the same manner as the communication terminal 600. Therefore, the communication terminal 600 receives a set of image data which include image data captured by the other communication terminals and the widgets superimposed on the respective captured image data from the other communication terminals, and displays the set of image data on the display device 610.

In this case, in the area 613 of the display device 610, the widget 614, which indicates the use status of power in the location "B", is displayed in a superimposed manner on the image data. Further, in the area 615 of the display device 610, the widget 616, which indicates the use status of power in the location "C", is displayed in a superimposed manner on the image data. Further, in the area 617 of the display device 610, the widget 618, which indicates the use status of power in the location "D", is displayed in a superimposed manner on the image data.

Therefore, on the display device 610, a set of the use status of power in those locations are displayed, so that it becomes possible to cause the users who participate in the conference using the video conference system to recognize each of the use status of power in the locations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power display system comprising:
a plurality of electronic apparatuses; and
a server connected to an electronic apparatus group, the electronic apparatus group including the plurality of electronic apparatuses, each electronic apparatus of the electronic apparatus group including a sensor configured to measure a consumption of power by the electronic apparatus, the server including,
a memory having computer readable instructions, and
at least one processor configured to execute the computer readable instructions to,
receive power consumption information from each of the electronic apparatuses of the electronic apparatus group, the power consumption information including an actual amount of power consumed by each individual electronic apparatus of the electronic apparatuses of the electronic apparatus group,
calculate a total power consumption information from the consumption of power measured by each of the sensors of the electronic apparatuses of the electronic apparatus group,
calculate a ratio of the total power consumption information to a target value of the power consumption for each of the electronic apparatuses of the electronic apparatus group, the calculating the ratio of the total power consumption information to the target value of the power consumption including calculating a target value of total consumption power for the entire electronic apparatus group, and
transmit the respective calculated ratio to each of the electronic apparatuses of the electronic apparatus group; and
each of the electronic apparatuses of the electronic apparatus group are configured to,
receive the calculated ratio from the server,
display a first screen displaying a plurality of functions corresponding to the electronic apparatus,
display in the first screen a user interface element that indicates a power use status in a first display manner that corresponds to the received calculated ratio,
receive a selection of at least one function to be executed from the plurality of functions corresponding to the electronic apparatus via the displayed first screen,
display a second screen for receiving settings of the selected function, and
display in the second screen the user interface element that indicates the power use status in a second display manner that corresponds to the received calculated ratio.

2. The power display system according to claim 1, wherein the at least one processor is further configured to:
refer to a use status table storing use status information sets each including the calculated ratio in association with the second screen corresponding to an electronic apparatus type and a display status of the second screen, and
extract a use status information set which corresponds to the calculated ratio,
wherein each of the electronic apparatuses are configured to display the second screen based on the extracted use status information set.

3. The power display system according to claim 2, wherein each of the use status information sets includes a status, which indicates a use status corresponding to the calculated ratio, a plurality of electronic apparatus control settings, which are included in the second screen, display positions of the control settings, display sizes of the control settings, and a display manner of the second screen.

4. The power display system according to claim 3, wherein the at least one processor further configured to:
  determine a type of a selected function in the electronic apparatus based on a received message from the electronic apparatus; and
  acquire a display control table which corresponds to the selected function from a memory unit storing display control tables,
  transmit the acquired display control table to the electronic apparatus, the acquired display control table including the status in association with the display manner of the second screen,
  wherein the electronic apparatus is further configured to display the second screen in the display manner which corresponds to the status in the display control table.

5. The power display system according to claim 3, wherein the control settings which are included in the second screen include image data indicating the status, image data indicating the calculated ratio, and image data indicating a message corresponding to the status.

6. The power display system according to claim 1, wherein at least one of the electronic apparatuses is an image processing apparatus.

7. The power display system according to claim 1, further comprising:
  a first execution part configured to execute a process corresponding to a first function among the plurality of functions;
  wherein the at least one processor is further configured to display, when the first execution part executes the process corresponding to the first function, a third screen including the user interface element.

8. The power display system according to claim 7, wherein
  the first execution part comprises a plotter; and
  the first function comprises a printing function.

9. The power display system according to claim 1, further comprising:
  a second execution part configured to execute a process corresponding to a second function among the plurality of functions;
  wherein the at least one processor is further configured to display when the second execution part has ended the process corresponding to the second function, a fourth screen including the user interface element.

10. The power display system according to claim 9, wherein
  the second execution part comprises a scanner; and
  the second function comprises a reading function of the scanner.

11. An image processing apparatus connected to a server configured to calculate total power consumption of each electronic apparatus of an electronic apparatus group, the electronic apparatus group including a plurality of electronic apparatuses and the image processing apparatus, each apparatus of the electronic apparatus group including a sensor configured to measure a consumption of power by the respective apparatus, the image processing apparatus further comprising:
  a memory having computer readable instructions; and
  at least one processor configured to execute the computer readable instructions to,
    transmit power consumption information related to the power consumption of the image processing apparatus to the server, the power consumption information including an actual amount of power consumed by the image processing apparatus,
    acquire, from the server, a use status information set which includes a calculated ratio of a total power consumption information to a target value of the power consumption of the image processing apparatus wherein the ratio is calculated by the server, the ratio calculated using a target value of total consumption power for the entire electronic apparatus group which is calculated by the server, and the total power consumption information includes total power consumption information of the entire electronic apparatus group calculated by the server from the consumption of power measured by each of the sensors of the apparatuses of the electronic apparatus group,
    display a first screen displaying a plurality of functions corresponding to the image processing apparatus,
    display in the first screen a user interface element that indicates a power use status in a first display manner that corresponds to the calculated ratio,
    receive a selection of at least one function to be executed from the plurality of functions corresponding to the electronic apparatus via the displayed first screen,
    display a second screen for receiving settings of the selected function, and
    display in the second screen the user interface element that indicates the power use status in a second display manner that corresponds to the acquired calculated ratio.

12. The image processing apparatus according to claim 11, wherein the at least one processor is further configured to:
  receive a use status table from the server, the server configured to store use status information sets each including the calculated ratio in association with the second screen and a display status of the second screen associated with a plurality of electronic apparatus types;
  extract a use status information set which corresponds to the calculated ratio from the use status table; and
  display the second screen based on the extracted use status information set.

13. The image processing apparatus according to claim 12, wherein each of the use status information sets includes a status, which indicates a use status corresponding to the calculated ratio, a plurality of control settings, which are included in the second screen, display positions of the control settings, display sizes of the control settings, and a display manner of the second screen.

14. The image processing apparatus according to claim 13, wherein the at least one processor is further configured to:
  transmit a message to the server, the message including an indication of a function of the image processing apparatus selected by a user;
  acquire a display control table which corresponds to the selected function from the server, in response to the transmitted message, the display control table including the status in association with the display manner of the second screen; and
  display the second screen on a display panel of the image processing apparatus in the display manner which corresponds to the status in the display control table.

15. The image processing apparatus according to claim 13, wherein the plurality of control settings correspond to the image processing apparatus and include image data indicating the status, image data indicating the calculated ratio, and image data indicating a message corresponding to the status.

16. A non-transitory computer readable medium including computer readable instructions, which when executed by at least one processor of an image processing apparatus, the image processing apparatus connected to a server configured to calculate total power consumption of each electronic apparatus of an electronic apparatus group, the electronic apparatus group including a plurality of electronic apparatuses and the image processing apparatus, each apparatus of the electronic apparatus group including a sensor configured to measure a consumption of power by the respective apparatus, cause the at least one processor to:

transmit power consumption information related to the power consumption of the image processing apparatus to a server, the server configured to connect to a plurality of electronic apparatuses including the image processing apparatus, the power consumption information including an actual amount of power consumed by the image processing apparatus;

acquire, from the server, a use status information set which includes a calculated ratio of a total power consumption information to a target value of the power consumption of the image processing apparatus wherein the ratio is calculated by the server, the ratio calculated using a target value of total consumption power for the entire electronic apparatus group which is calculated by the server, and the total power consumption information includes total power consumption information of the entire electronic apparatus group calculated by the server from the consumption of power measured by each of the sensors of the apparatuses of the electronic apparatus group;

display a first screen displaying a plurality of functions corresponding to the image processing apparatus;

display in the first screen a user interface element that indicates a power use status in a first display manner that corresponds to the calculated ratio;

receive a selection of at least one function to be executed from the plurality of functions corresponding to the electronic apparatus via the displayed first screen;

display a second screen for receiving settings of the selected function; and display in the second screen the user interface element that indicates the power use status in a second display manner that corresponds to the acquired calculated ratio.

17. The non-transitory computer readable medium according to claim 16, wherein the at least one processor is further caused to:

receive a use status table from the server, the server configured to store use status information sets each including the calculated ratio in association with the second screen and a display status of the second screen;

extract a use status information set which corresponds to the calculated ratio from the use status table; and display the second screen based on the extracted use status information set.

18. The non-transitory computer readable medium according to claim 17, wherein each of the use status information sets includes a status, which indicates a use status corresponding to the calculated ratio, a plurality of control settings, which are included in the second screen, display positions of the control settings, display sizes of the control settings, and a display manner of the second screen.

19. The non-transitory computer readable medium according to claim 18, wherein the at least one processor is further configured to:

transmit a message to the server, the message including an indication of a function of the image processing apparatus selected by a user;

acquire a display control table which corresponds to the selected function from the server, in response to the transmitted message, the display control table including the status in association with the display manner of the second screen; and display the second screen in the display manner which corresponds to the status in the display control table.

* * * * *